United States Patent
Laberge et al.

(10) Patent No.: US 9,488,992 B2
(45) Date of Patent: Nov. 8, 2016

(54) WALL MODULE CONFIGURATION TOOL

(75) Inventors: Jason Laberge, New Brighton, MN (US); Ankur Jhawar, Karnataka (IN); Siddharth Ghule, Bangalore (IN); Gary Paul Kasper, Champlin, MN (US); William Bray, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1068 days.

(21) Appl. No.: 12/252,673

(22) Filed: Oct. 16, 2008

(65) Prior Publication Data

US 2010/0100829 A1 Apr. 22, 2010

(51) Int. Cl.
*G05D 23/19* (2006.01)
*F24F 11/00* (2006.01)
*H04L 12/28* (2006.01)

(52) U.S. Cl.
CPC ....... *G05D 23/1902* (2013.01); *F24F 11/0012* (2013.01); *H04L 12/2814* (2013.01); *F24F 2011/0091* (2013.01); *H04L 2012/285* (2013.01)

(58) Field of Classification Search
USPC ........................................................ 715/764
See application file for complete search history.

(56) References Cited

U.S. PATENT DOCUMENTS

| | | | |
|---|---|---|---|
| 3,058,484 A | 10/1962 | Feiring | |
| 3,107,685 A | 10/1963 | Scaramucci | |
| 3,132,836 A | 5/1964 | Dickerson et al. | |
| 3,150,681 A | 9/1964 | Hansen et al. | |
| 3,179,121 A | 4/1965 | Bredtschneider et al. | |
| 3,198,477 A | 8/1965 | Allenbaugh, Jr. | |
| 3,743,242 A | 7/1973 | Scaramucci | |
| 4,562,860 A | 1/1986 | Walter et al. | |
| 4,606,368 A | 8/1986 | McCafferty | |
| 4,654,653 A | 3/1987 | Brindle et al. | |
| 4,721,870 A | 1/1988 | Rector et al. | |
| 4,723,513 A | 2/1988 | Vallett et al. | |
| 4,784,580 A | 11/1988 | Takata et al. | |

(Continued)

FOREIGN PATENT DOCUMENTS

| | | |
|---|---|---|
| EP | 1008817 | 6/2000 |
| EP | 1380909 | 1/2004 |

(Continued)

OTHER PUBLICATIONS

Alerton Technologies, Inc., "BACtalk Microset II Wall Unit, Product Nos. MS-2000-BT & MS-2000H-BT (with Optional Humidity Sensor)," 2 pages, 1999.

(Continued)

*Primary Examiner* — Peiyong Weng
(74) *Attorney, Agent, or Firm* — Seager, Tufte & Wickhem LLP

(57) ABSTRACT

The invention is a system for selecting and previewing a configuration for a wall module before a download of the configuration to the wall module. The configuration may be selected from a set of standard applications or it may be a customized standard application. The configuration may instead be a new application. The configuration may be changed, such as screen segment selection, during a preview of it. A memory usage meter may indicate how much memory is used relative to the amount available in the wall module for the configuration. Also the system may have an autobind to a controller feature for time parameters. New application or customized standard application configurations may be saved to a library for future use.

7 Claims, 33 Drawing Sheets

(56) References Cited

U.S. PATENT DOCUMENTS

| | | | |
|---|---|---|---|
| 4,793,800 A | 12/1988 | Vallett et al. | |
| 5,449,319 A | 9/1995 | Dushane et al. | |
| 5,479,812 A | 1/1996 | Juntunen et al. | |
| 5,605,280 A | 2/1997 | Hartman | |
| 5,689,669 A * | 11/1997 | Lynch et al. | 715/848 |
| 5,778,368 A | 7/1998 | Hogan et al. | |
| 5,944,054 A | 8/1999 | Saieva | |
| 5,989,020 A | 11/1999 | Glass et al. | |
| 6,008,805 A | 12/1999 | Land et al. | |
| 6,134,583 A | 10/2000 | Herriot | |
| 6,272,400 B1 | 8/2001 | Jankins et al. | |
| 6,330,806 B1 | 12/2001 | Beaverson et al. | |
| 6,428,312 B1 | 8/2002 | Smelcer et al. | |
| 6,453,687 B2 | 9/2002 | Sharood et al. | |
| 6,536,678 B2 | 3/2003 | Pouchak | |
| 6,549,826 B1 | 4/2003 | Pouchak et al. | |
| 6,615,404 B1 | 9/2003 | Garfunkel et al. | |
| 6,619,951 B2 | 9/2003 | Bodnar et al. | |
| 6,694,926 B2 | 2/2004 | Baese et al. | |
| 6,745,085 B2 | 6/2004 | Pouchak | |
| 6,832,120 B1 | 12/2004 | Frank et al. | |
| 6,934,762 B1 | 8/2005 | Lange et al. | |
| 6,934,862 B2 | 8/2005 | Sharood et al. | |
| 6,996,600 B2 | 2/2006 | Gagner et al. | |
| 7,071,727 B2 | 7/2006 | Ganton | |
| 7,083,109 B2 | 8/2006 | Pouchak | |
| 7,120,908 B1 | 10/2006 | Klimchynski | |
| 7,124,163 B2 | 10/2006 | Geofroy et al. | |
| 7,124,205 B2 | 10/2006 | Craft et al. | |
| 7,188,779 B2 | 3/2007 | Alles | |
| 7,222,800 B2 | 5/2007 | Wruck | |
| 7,225,426 B2 | 5/2007 | Frank et al. | |
| 7,269,646 B2 | 9/2007 | Yamamoto et al. | |
| 2003/0158975 A1 | 8/2003 | Frank et al. | |
| 2004/0144849 A1 | 7/2004 | Ahmed | |
| 2005/0040250 A1* | 2/2005 | Wruck | 236/51 |
| 2005/0204020 A1 | 9/2005 | Obrien et al. | |
| 2005/0230490 A1 | 10/2005 | Pouchak et al. | |
| 2006/0159007 A1 | 7/2006 | Frutiger et al. | |
| 2008/0244582 A1* | 10/2008 | Brown et al. | 718/100 |

FOREIGN PATENT DOCUMENTS

| | | |
|---|---|---|
| GB | 2257538 | 1/1993 |
| GB | 2262625 | 6/1993 |
| JP | 2001117810 | 4/2001 |
| WO | 03067457 | 8/2003 |

OTHER PUBLICATIONS

Aube, Drawings of Circuits 1 and 2, 2 pages, Date of Public Use or Disclosure Not Yet Determined as of May 28, 2008.
Carrier Corporation, "3V Control System, System Pilot, Part No. 33PILOT-01," Product Specification, 4 pages, Sep. 2004.
Carrier, "System Pilot, Part No. 33PILOT-01," Installation and Operation Instructions, 20 pages, 2004.
Carrier, "System Pilot, Part No. 33PILOT-01," Owner's Manual, 8 pages, 2004.
Central and Southwest Communications, "Customer Choice and Control Thermostat Touchpad," User Guide, 15 pages, May 1996.
Echelon, "Introduction to the LonWorks System, Version 1.0," 73 pages, 1999.
Echelon, "ShortStack Developer's Kit Model 23400," 3 pages, 2002.
Echelon, "Echelon ShortStack Micro Server Answers to Frequently Asked Questions," pp. 1-5, Apr. 2002.
Echelon, "ShortStack Overview," 12 pages, prior to Nov. 29, 2006.
Echelon, "ShortStack User's Guide, Version 2" 152 pages, Mar. 2002.
Honeywell, "S7340A System User Interface," Specification Data, 2 pages, Nov. 1999.
Honeywell, "Command Display S7760A EPROM Replacement," Installation Instructions, 2 pages, 2002.
Honeywell, "Command Display S7760A," User Guide, 41 pages, Feb. 2000.
Honeywell, "Excel 15 S7760A Comman Display," Installation Instructions, 8 pages, Feb. 1999.
Honeywell, "Excel 15 S7760A Comman Display," Specification Data, 2 pages, Nov. 1998.
Honeywell, "S7760A Command Display for RapidZone Solution," 12 pages, Feb. 2001.
Honeywell, "FocusPro TH6320R Wireless Thermostat," Operating Manual, 62 pages, Jul. 2008.
Honeywell, "T7525A and T7526A Thermostat Touchpads," 6 pages, Oct. 1994.
Honeywell, "T7525A/T7526A Thermostat Touchpads," User Guide, 12 pages, May 1995.
Honeywell, "TB8220U Commercial VisionPRO Programmable Thermostat," Installation Instructions,16 pages, Jan. 2008.
Honeywell, "FocusPRO TH6000 Series, Installation Guide," 16 pages, Mar. 2006.
Honeywell, "PVL6436A, PVL6438N, PUL6438 Programmable VAV/Unitary Controllers," Installation Instructions, 24 pages, Dec. 2006.
Honeywell, "T7560A,B,C Digital Wall Module," Installation Instructions, 8 pages, 2003.
Honeywell, "T7560A,B, Digital Wall Module," Specification Data, 8 pages, May 1999.
Honeywell, "T7770A,B,C,D,E,F,G, Wall Modules, Excel 5000 Open System," Specification Data, 4 pages, May 1997.
Honeywell, "TB8220 Commercial VisionPro Programmable Thermostat VisionPro 8000 Touchscreen," Product Data, 24 pages, Dec. 2006.
Delta Controls, "HVAC, Network Sensors BACstatII: DNS-24/H24," 2 pages, Oct. 2004.
Invensys, "Micronet Sensors, DS 10.000, MN Sx Series, Data Sheets," 4 pages, Mar. 2003.
Invensys, "Micronet Sensors, MN-SXXX Series," 4 pages, Mar. 2002.
Johnson Controls, Inc., "Room Sensor with LCD Display (TMZ1600)," Installation Instructions, 14 pages, Apr. 12, 2006.
Johnson Controls, Inc., "TMx1600 Room Sensor with LCD Display," Product Bulletin, 4 pages, Jul. 20, 2006.
Johnson Controls, Inc., "TMx1600 Room Sensor with LCD Display," Product Bulletin, 4 pages, Jan. 2001.
"LonMark Functional Profile: VAV Controller (VAV)," pp. 1-19, 1996.
Reliable Controls, "SMART-Sensor LCD, Mach System" 2 pages, 2006.
Robertshaw, "Deluxe Programmable Thermostats, Models 9801i, 9815i and 9820i, Quick Start Installation Manual," 2 pages, prior to Dec. 14, 2007.
Robertshaw, "Deluxe Programmable Thermostats, Models 9801i, 9815i and 9820i," User's Manual, 28 pages, Jul. 2004.
Robertshaw, "Deluxe Programmable Thermostat, Models 9801i," 2 pages, Aug. 2003.
Robertshaw, "Deluxe Programmable Thermostats, Models 9815i," 2 pages, Aug. 2003.
Robertshaw, "Deluxe Programmable Thermostats, Models 9820i," 2 pages, Aug. 2003.
Trane, "Digital Display Zone Sensor," 2 pages, 2002.
Trane, "Operating Instructions," 1 page, prior to Oct. 16, 2008.
Trane, "Digital Display Zone Sensor," 1 page, 2004.

* cited by examiner

Figure 4

Wall Module Configuration Wizard

☐ General Settings

General Settings

Block Name: S-Bus Wall Module — 28
Block Type: WallModule

Wall Module Model Selection

Wall Module Type: Temperature, Humidity, CO2 ▷

Model Options: ☑ LCD Display  ☑ 2-Wire (Sensor Bus) Communication

Select Model: TR70-HCO2 = Temp, Hum, CO2 (LCD, 2Wire) ▷

Application Selection

Application Type: Standard Application ▷

Select Application: VAV- No Balance, Network Override ▷

Click customize if you want to view or modify
how the LCD display model is configured  [ Customize ] — 29

Wall Module Address: 1 ▷

Time Display Format: 12 hour ▷

Selected Model (TR70-HCO2 = Temp, Hum, CO2 (LCD, 2Wire))

Model Capabilities:
- Temperature (20K NTC), Humidity, CO2 sensors — navigation keypad
- 2-wire (Sensor Bus) communication — Scroll keypad
- Configurable LCD display — LON network jack

[ Help ] [ Preview ]  [ Finish ] [ Cancel ]

Wall Module Configuration Wizard

☐ General Settings
☑ Categories and Parameters — 54
☐ Home Screen Options
☐ Occupancy and Override
☐ Fan Command
☐ System Status and Command
☐ Preview ☑ Show Wall Module Memory Usage    110%    ← 60

[Help] [Preview] [Save to Library]

---

Categories and Parameters
Memory Usage Help Message — 38

The distribution of memory usage for the current configuration is as follows:

| Function | Bytes | % |
|---|---|---|
| Categories | XX | 15 |
| Parameters | XX | 60 |
| Home Screen Options | XX | 25 |
| Occupancy and Override | XX | 5 |
| Fan Command | XX | 5 |
| System Status/Command | XX | 5 |
| Total | XXX | 110 |

Pie chart: 55%, 25%, 15%, 5%, 5%, 5%

To optimize memory usage, consider the following strategies:
- Remove parameters that are not critical to effective operations
- Use fewer categories for your parameters
- Minimize the number of values from wall module parameters
- Reduce the number of home screen options
- Remove some occupancy override settings
- Remove fan and system status and command Typical memory usage for each component are shown in the table to the right:

| Component | Bytes |
|---|---|
| Sensor parameter | 46 |
| Time parameter | 34 |
| Dynamic value parameter | 34 |
| Value from wall module parameter | 34 |
| Sensor offset value parameter | 34 |
| Occupancy override setting | 21 |
| Value from controller parameter | 18 |
| Category | 10 |
| Fan command setting | 5 |
| System command setting | 5 |
| Home screen option | 3 |

Note: Use "Up" and "Down" arrow keys to order sequence of category/parameter in wall module

[Close]    [Finish] [Cancel]

Wall Module Configuration Wizard

☐ General Settings

Home Screen Options

Home Screen Options Available for Selection from the Wall Module

☐ Categories and Parameters

☐ Home Screen Options ← 54

☐ Occupancy and Override

☐ Fan Command

☐ System Status and Command

☐ Preview

☐ Show Wall Module Memory Usage

Setpoint, Outside, Room (Default)
Room, Outside, Setpoint
Setpoint, Room
Room, Setpoint
Room
Room, Time
Room, Outside, Time
New Home

[ Set as Default ]  [ Add ]  [ Edit ]  [ Remove ]  ☐ Set as Default

Note: Use "Up" and "Down" arrow keys to re-order sequence of category/parameter in the wall module

New Home Details

Option Name: [ New Home 1 ]

Description: [ ] ← 65

Option Type: ◆ Multiple Parameter (Up to Three Values with Fixed Labels) — 66
◇ Single Parameter (One Value with Custom Eight Character Label)

Click Boxes to Select Lables to Show

| ROOM SETPOINT | HUMIDITY OUTSIDE |
|---|---|
| NONE ▽ | NONE ▽ % |
| (max 3 digits) | (max 3 digits) |
| | ROOM SETPOINT TEMPERATURE |
| | °F °PPM ☐ AM °C ☐ S PM ☐ CM ☐ INCH |
| | NONE ▽ |
| | (max 4 digits) |

↑ 67

Note: Select the parameter you want to show from the drop down lists

[ Save ]  [ Cancel ]

[ Help ]  [ Preview ]  [ Save to Library ]   [ < Back ]  [ Next > ]   [ Finish ]  [ Cancel ]

WALL MODULE CONFIGURATION TOOL

BACKGROUND

The invention pertains to building environmental control systems and particularly to wall modules for providing input for control of the systems. More particularly, the invention pertains to configurations of the wall modules.

SUMMARY

The invention is a system for selection, modification of, or making a configuration for a customizable wall module. There may be screen customization and/or screen segment selection in a display for the wall module. The configuration features and the corresponding display may be previewed before being downloaded to the wall module. Configurations may be saved to a library for future use. There may be a memory usage indicator associated with the system. Also, an autobind of time parameters to controller feature may be incorporated.

BRIEF DESCRIPTION OF THE DRAWING

FIGS. 3-11 show screens which apply to standard and custom application selection and related activities;

FIGS. 12-14 show screens which indicate information relative to memory usage;

FIGS. 16-18 relate to selection and entry for the wall module;

FIGS. 19-20 relate to home screen options and preview screens of them;

FIGS. 21-22 show selection of parameters and labels in the preview screen;

FIG. 33 shows that if a finish button is pressed when excess memory has been used, then a pop up appears indicating such.

DESCRIPTION

Figure 1:
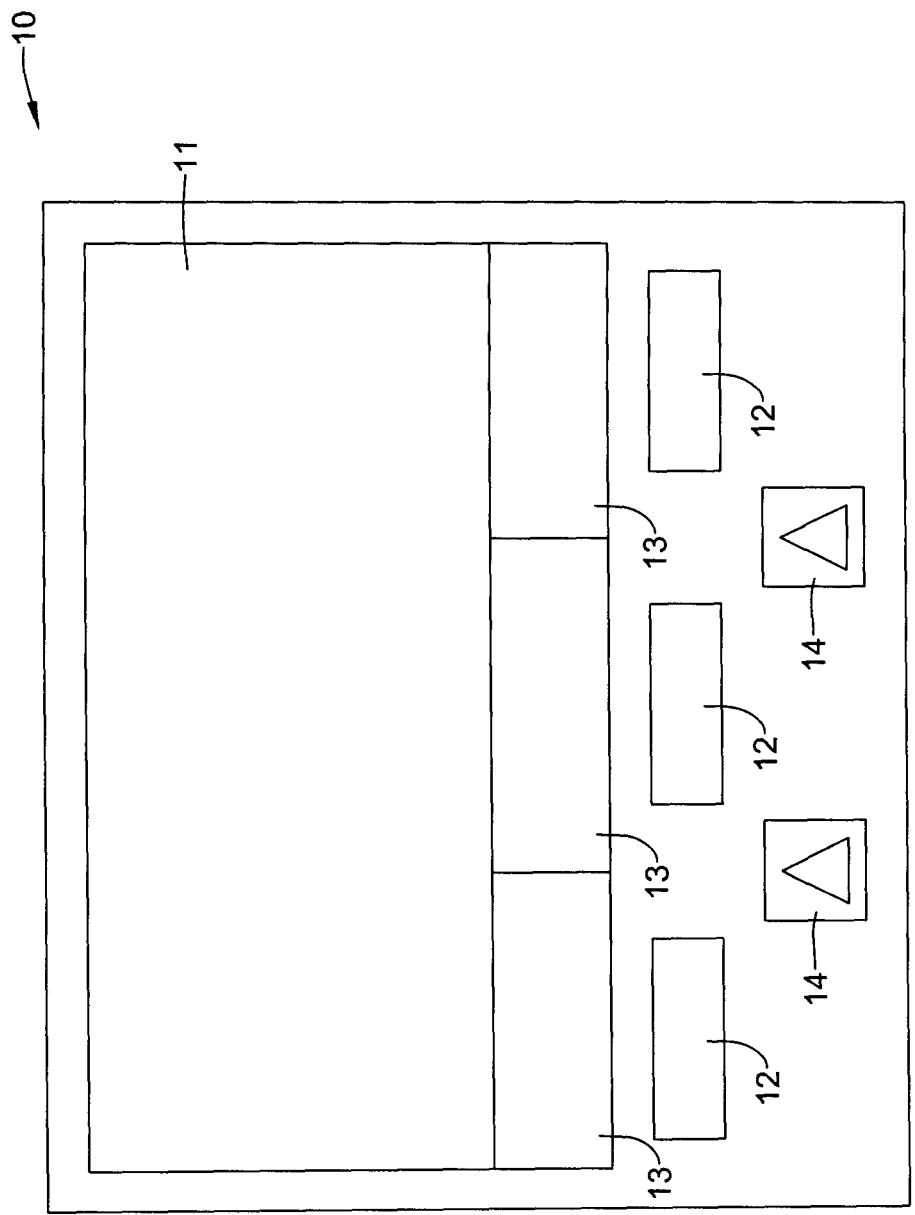
FIG. 1 shows an illustrative example of a wall module.

Wall modules may be the primary interface to the building automation system (BAS), heating, ventilation and air conditioning (HVAC) system or building environment sensing and control apparatus or system for building owners and tenants. The wall module is used not only to show local temperature, humidity, and/or $CO_2$ but also to control occupancy, fan, and setpoints (depending on the model). One aspect of the wall module display that can be configured is the screen elements (referred to herein also as screen segments) to be shown for customizing different screens (i.e., home screens, parameters, setpoints, sensors, and so forth). The present invention is an intuitive and easy approach of selecting custom screen segments which may ensure that a contractor (user) is confident that the segments selected are appropriate for the screens which the contractor is customizing.

The present invention is an approach for customizing a custom HVAC or building environment sensing and/or control wall module. The approach may include a software tool that includes a wizard. The tool may be used to customize the HVAC wall module and may have a function that allows users to select (i.e., switch on/off) the screen segments to show for different situations. To help the user make the selection effectively (and without errors), a preview of the actual screen may be shown with the available screen segments. The user may use the software tool to select the segments that the user wants to show for each situation (e.g., home screens, parameters, and so on). The selected segments may be highlighted (turned black or bolded) in the preview and this highlighting can provide feedback to the user so that the user can determine whether the appropriate segment was selected. Other ways may be used to show selection, e.g., checking boxes, doing listings, dragging and dropping, and so on. Since the user immediately knows how the display would look with the preview, the user can quickly correct any errors or undesired appearances in the customized screen before downloading the configuration to the wall module itself.

The present approach may support custom user interfaces in a fixed segment display platform. Once a user decides to add/edit a parameter or home screen, the user may get a preview display area in the software tool which mimics how the screen segments are laid out in the actual display. These segments may appear as boxes which can be selected/unselected by the user to determine if the wall module should show/hide the segment when the parameter or home screen is shown on the display.

The approach may include a list of default standard application configurations that can be selected by the user to minimize the level of effort required to setup the module. This feature provides the user with flexibility and ease of use when setting up the wall module display and configuration. Once the user selects the standard application configuration to the wall module, the wall module may be automatically set up, including relevant display and navigation parameters. If the user wants to customize the information/navigation in the standard application further, the user has flexibility to customize it from the software tool itself via a simple customize function. This aspect of the tool may allow the user to configure the display with minimum effort and at the same time allow customization of the display and information to be shown, providing maximum usability.

The present approach may have features that include standard applications in a library, the ability to customize existing applications or create new applications, memory usage indicator, intuitive approach of customizing the display, auto-preview of the current configuration, auto-bind to a controller, and so forth.

Standard applications in a library, the ability to customize existing applications or create new ones, a memory usage indicator, an intuitive approach of customizing the display, and auto-preview of the current configuration, and auto-binding to a controller may be features incorporated in the software tool to make it easy for the user to set up the HVAC wall module. Users may select a standard application from the application library which would have the configuration settings already defined for the wall module. If required, the user can make changes to this existing application by clicking on a customize button or can create a completely new application. In such cases, some default settings may be already done for the user by the software tool. When customizing or creating new applications, users can add/delete/edit properties and its related settings (e.g., limits, defaults, fixed segments to be lit) from the software tool. At the same time, users can enable/disable the default functions that are available (e.g., occupancy control/system settings/fan settings) by one mouse click. Users can even customize the limits for these individual functions if required. The customized or new applications may be saved to the library for future use. As the user is customizing the wall module and making functional changes, a memory meter may provide an indication of the available memory in the wall module for the selected configuration. Similarly, the auto preview feature shows how the changes that the user is making for the individual parameter/function would appear on the actual wall module display. Finally, the user can graphically customize the display by selecting the screen elements (i.e., segments) that should be enabled for different functions. This approach may provide an intuitive approach for display customization because the user can easily visualize how the wall module will work as the user is customizing the display. This feature can reduce errors since changes are immediately visible and the user can determine if the information does not appear appropriate and change it before a download of the configuration to the wall module.

Several patent applications may relate to the present invention. U.S. patent application Ser. No. 11/957,253, filed Dec. 14, 2007, is hereby incorporated by reference. U.S. patent application Ser. No. 11/923,471, filed Oct. 24, 2007, is hereby incorporated by reference. U.S. patent application Ser. No. 11/862,618, filed Sep. 27, 2007, is hereby incorporated by reference. U.S. patent application Ser. No. 11/777,873, filed Jul. 13, 2007, is hereby incorporated by reference. U.S. patent application Ser. No. 11/770,668, filed Jun. 28, 2007, is hereby incorporated by reference. U.S. patent application Ser. No. 11/747,657, filed May 11, 2007, is hereby incorporated by reference. U.S. patent application Ser. No. 11/670,911, filed Feb. 2, 2007, is hereby incorporated by reference. U.S. patent application Ser. No. 11/620,431, filed Jan. 5, 2007, is hereby incorporated by reference. U.S. patent application Ser. No. 11/564,797, filed Nov. 29, 2006, is hereby incorporated by reference. U.S. patent application Ser. No. 11/559,706, filed Nov. 14, 2006, is hereby incorporated by reference. U.S. patent application Ser. No. 11/427,750, filed Jun. 29, 2006, is hereby incorporated by reference. U.S. Pat. No. 6,549,826, issued Apr. 15, 2003, U.S. Pat. No. 6,536,678, issued Mar. 25, 2003, U.S. Pat. No. 5,479,812, issued Jan. 2, 1996, are hereby incorporated by reference.

FIG. 1 shows a customizable wall module 10 having a display 11. Module 10 may have one or more soft keys 12 with one or more corresponding labels 13 associated with the one or more soft keys 12, respectively, for indicating which items would appear on the screen 11 if one of the soft keys 12 is pressed. Up and down keys 14 may be used for selection of items or values on screen 11. The tool of the invention, for configuration purposes, may determine what appears on the screen.

Figure 2:
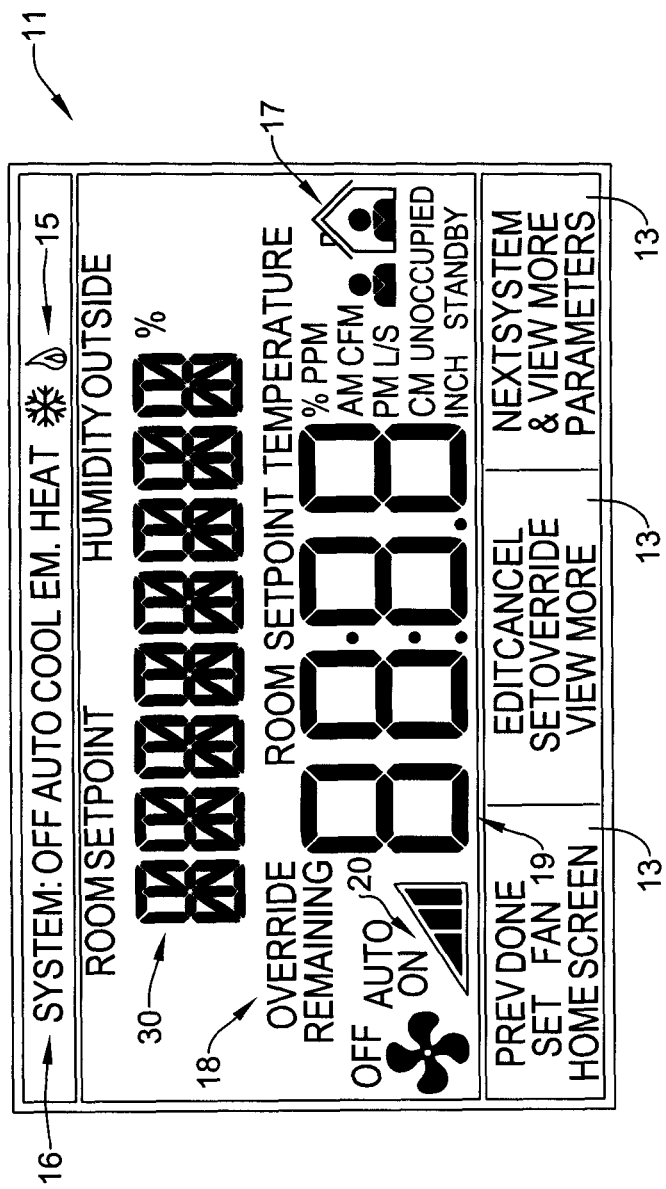
FIG. 2 shows a screen of a wall module having fixed segments.

FIG. 2 shows an example of display 11 having examples of segments. Soft key position guidelines may be followed in order to make the user interface work as described. Examples of segment labels 13 corresponding to soft keys 12 may include: 1) Fan state, Occupancy Override, and System & View More should be on separate keys; 2) Done, Cancel, and Next should be on separate keys; 3) Edit, Done, and Next should be on separate keys; 4) SET Home screen, SET View More, and Parameters should be on separate keys; 5) Occupancy Override and Cancel should be on the same key; and 6) Done, Cancel, and View More should be on separate keys. Other segment labels may be used.

A system area may consist of two parts which are System Status 15 and System mode setpoint 16. The System symbol and line may be displayed it either system status 15 or system mode setpoint 16 is configured. The System Status 15 may be a flake, flame, or no symbol. Flake may be displayed if in COOL or REHEAT mode. Flame may be displayed if in HEAT, or REHEAT mode. No symbols are necessarily displayed if the system is OFF.

The System mode setpoint 16 may be OFF, AUTO, COOL, HEAT and/or EMERGENCY. OFF may be displayed if tenant commanded OFF from the wall module. AUTO may be displayed if tenant commanded AUTO from the wall module. COOL may be displayed if tenant commanded COOL from the wall module. HEAT may be displayed if tenant commanded HEAT or Emergency Heat from the wall module. EMERGENCY may be displayed if tenant commanded Emergency heat from the wall module. Note that the contractor may set all of the setpoints from the Tool.

There may be an occupancy status area 17. The contractor, via the Tool, may configure effective occupancy to be always displayed or instead show the commanded override if in override. If status area 17 shows an effective occupancy, then the "Occupied" symbol may be displayed if in occupied mode, the Unoccupied symbol may be displayed if in unoccupied mode, and the Standby symbol may be displayed if in standby. If the tenant is commanding an override, then the Occupied, Unoccupied or Standby symbol may be shown to indicate the command, the Override symbol 18 may be shown on screen 11 to indicate the tenant is requesting override, a time remaining symbol 18 may be shown to indicate if the tenant currently selected a timed override.

The middle alpha numeric area 19 may display the amount of timed override entered by the tenant. This could be time or days remaining. Nothing might be shown if the time is continuous. The top alpha numeric area 30 may show "HOURS" or "DAYS", if the current selection is a timed override. The wall module could show "HOLD" if continuous override. In other words, for continuous override, "HOLD" may be shown as in area 30.

There may be a fan setpoint area 20. The fan symbol may be displayed if area 20 is configured by the contractor. The fan symbol does not necessarily stand alone. It may be present with at least one of the other symbols. Another symbol OFF may be displayed if the tenant or Tool commanded OFF. AUTO may be displayed if the tenant or Tool commanded AUTO. ON may be displayed if the tenant or Tool commanded ON (2 or 3 position). BAR1 may be displayed if the tenant or Tool commanded speed 1 from the wall module (5-position). "BAR1+BAR2" may be displayed if the tenant or Tool commanded speed 2 from the wall module (5-position). A BAR1+BAR2+BAR3 may be displayed if the tenant or Tool commanded speed 3 from the wall module (5-position). There could be a different number of positions.

There may be the top alpha numeric area 30. The left portion of area 30 may contain a value with the Room or Setpoint symbol optionally displayed. The right portion of area 30 may contain a value with the Outside, Humidity %, or both symbols optionally displayed.

The middle alpha numeric area 19 may optionally display a value. The Setpoint, Temperature and/or Room symbols may be optionally displayed. A unit symbol may be optionally displayed. The appropriate decimal point may be displayed.

Area 19 may optionally displays the current time including a colon. Time may be displayed as configured by the Tool in 12/24 hour format. The AM/PM symbols may be shown as appropriate. Areas 30, 19 and 18 may optionally display the Time Remaining and Override symbols if an override is commanded.

Figure 3:
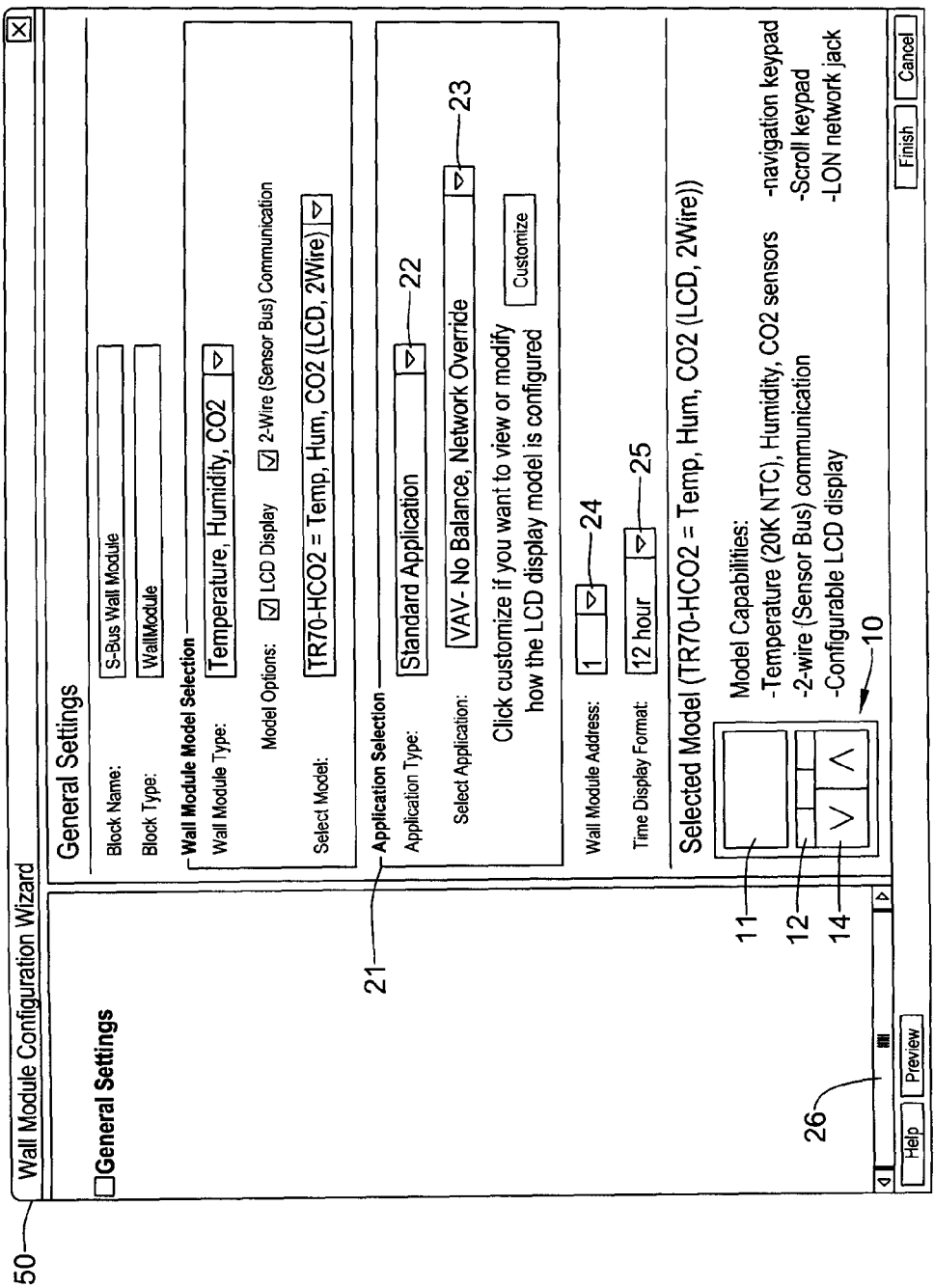

FIGS. 3-11 show screens that apply to configuring via the software tool standard and custom application selection, customization, saving to library, model selection, and so on. Screen 11 relates to the wall module and screen 50 relates to the present tool for wall module configuration. This screen designation number may apply to the screens of similar Figures in the present description. Similar components of the various Figures may have the same designation numbers. In FIG. 3, component or item 21 is where an application area is selected. This functionality may be hidden until the appropriate (e.g., TR70) wall module model 10 is selected. The fields of the application area 21 are shown automatically when a user drops a wall module block to the wire sheet and selects "Configure Properties". A component may be referred to as an item, although the term component is generally used herein.

Component 22 is an application type drop down list. An application type may be selected. There may be different application types that the user can select. One could be a standard application (default). This selection defaults to the standard application location in the software tool. Standard application names are shown in the select application drop down list. Another is a custom application defined by the user using the software tool. This selection defaults to the current application location in the software tool. The user can browse to a different file location if user wants to save the custom application (component 32). Existing custom application names would be shown in the selection application drop down list (component 23). A third selection type may be a new application. This selection hides the select application drop down list and the user is immediately shown all the wizard steps, component 60 in FIG. 10.

Component 23 is a select application drop down list. The list shows available applications. The default standard application may be "VAV-No Balance, Network Override Time", as shown in item 27 in FIG. 4, unless an application has already been selected (i.e., opening wizard after initial configuration). A default for custom applications may be the first (if any) applications in the default location. If no applications are in the custom library, "Select . . . " is shown.

Application selection will show list of applications which are either compatible in terms of an onboard sensor or a subset of onboard sensors of the selected model. For example, if a model with a Temperature and CO2 sensor is selected "Select Application" will just show applications having Temperature/CO2/Temperature+CO2/none sensors. This has been done to avoid complicated rules that would occur in case one shows all applications irrespective of the model type.

Component 24 may be a wall module address drop down list having a data range from 1 to 15 with a maximum of two digits. The maximum and minimum of the range and digits could be different than as indicated. The range is selectable. Functionality may have an address for wall modules on a 2 wire bus (corresponding to dip switch selections). A default may be 1. This field may be hidden for any wall modules that are not on a 2 wire bus.

Component 25 may be the time display format which is selectable. Here the user may specify whether time is shown in 12 hour or 24 hour units.

Component 26 may be a preview button which is clickable. The preview button is shown as soon as a user selects a certain model and application (or new application). When clicked, a small pop up is shown which simulates the wall model functionality based on the application selected and the configuration options defined to that point in the wizard.

Figure 4:
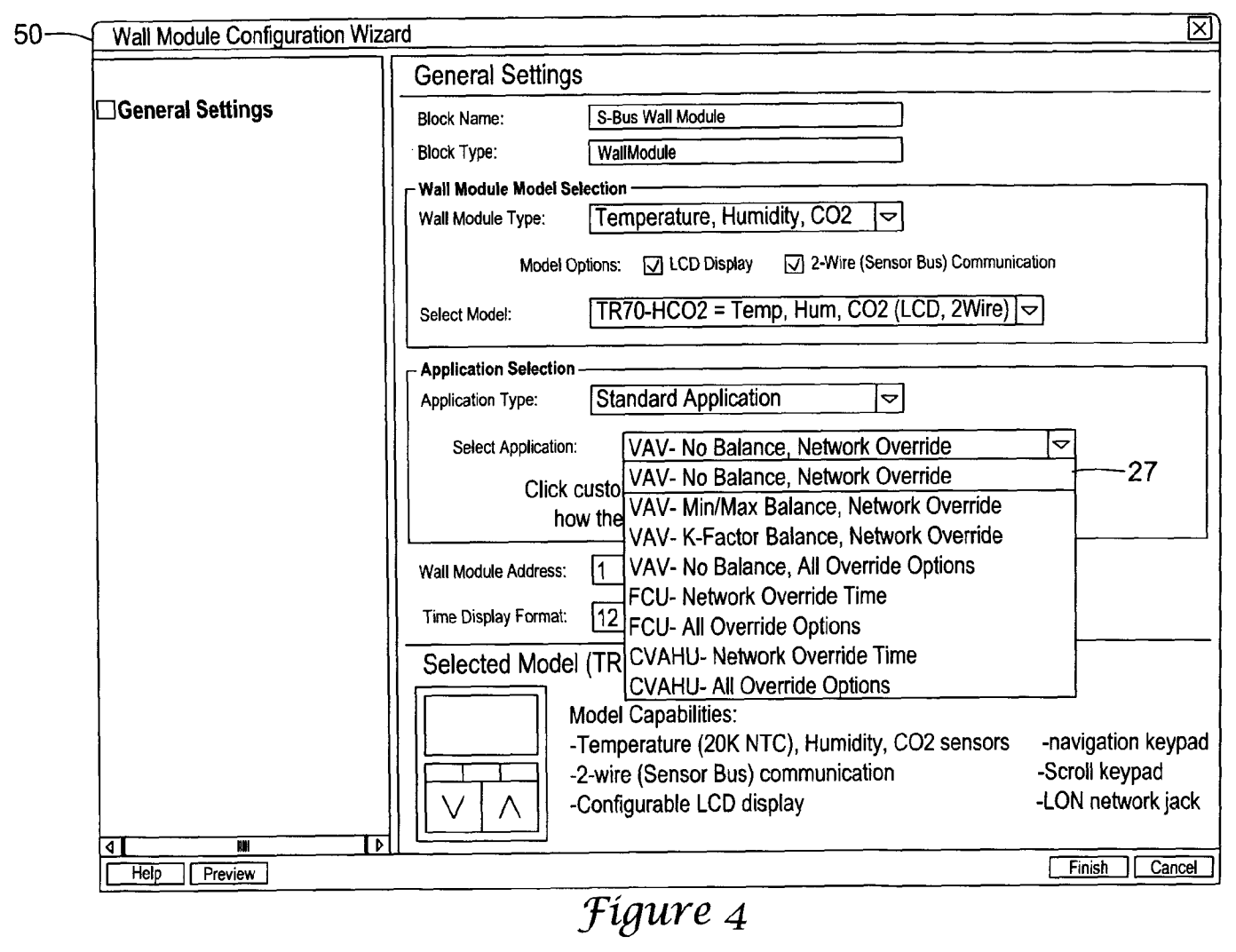

Component 27 of FIG. 4 is a select application drop down list for available applications. If one selects an application and then changes to another application (including custom applications), one may get a warning indicating that you want to change the application. One may note that this warning only applies when a user changes an application. It does not apply if the user first selects an application.

In FIG. 5, component 28 shows a block name. It may change to a name of the saved application. It is editable. The block name field may assume the name of the saved application that the user selects (in this case the VAV application). Then one can edit the name to what one wants. The relevant fields may change to show the selected application configuration. The tool could be tied in with a function block engine platform.

Component 29 is a customize button with text. It is clickable. Selecting a saved standard or custom application from the select application list shows the "Customize" button and text. Pressing the customize button may show all the wizard steps and buttons. When the customize button is pressed, one may get a warning indicating any changes you make must be saved under a new application name.

Figure 6:
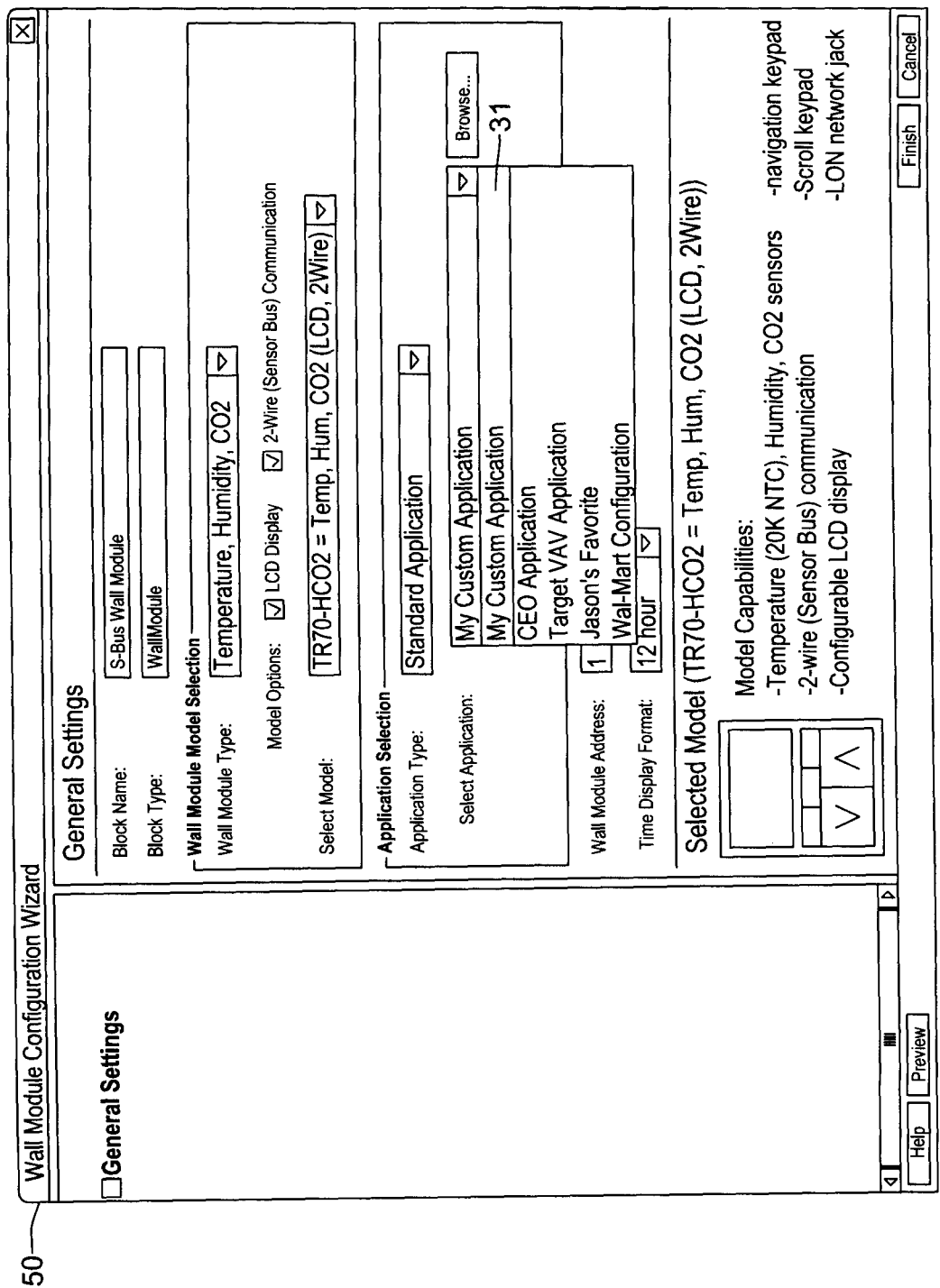

Component 31 in FIG. 6 is a selection application drop down list. Names of applications may be in the folder/directory and are selectable. An assumption may be that the user has created a custom application from scratch. The user has not started with a standard application. The user may be shown the names of wall module applications in the selected custom library location.

Figure 7:
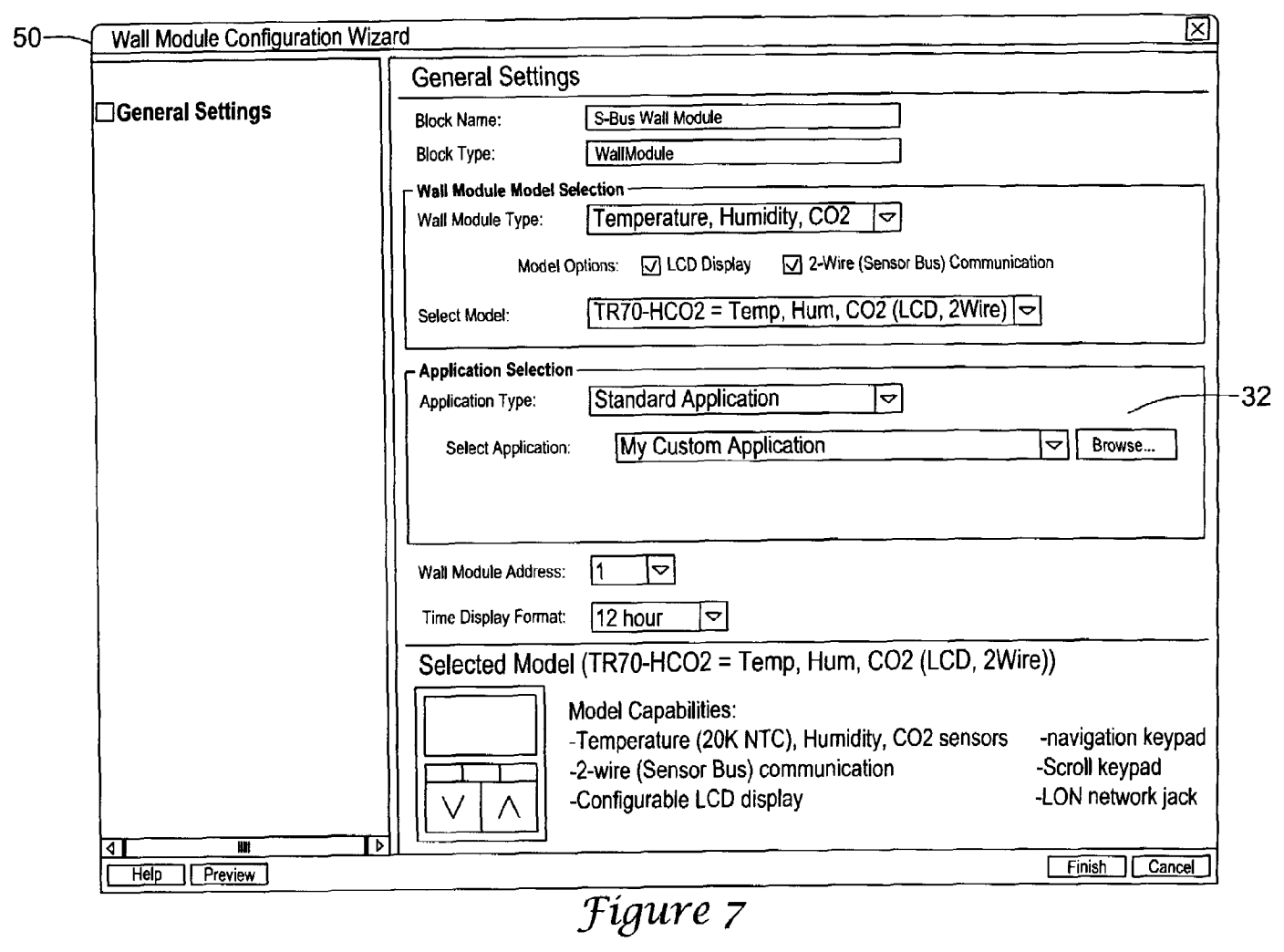

Component 32 is a clickable browse button, as shown in FIG. 7. When the user selects a custom application type, the user may have an option to browse to different file locations to view the custom applications one has created. The browse button may be hidden for both standard applications and new application types.

Figure 8:
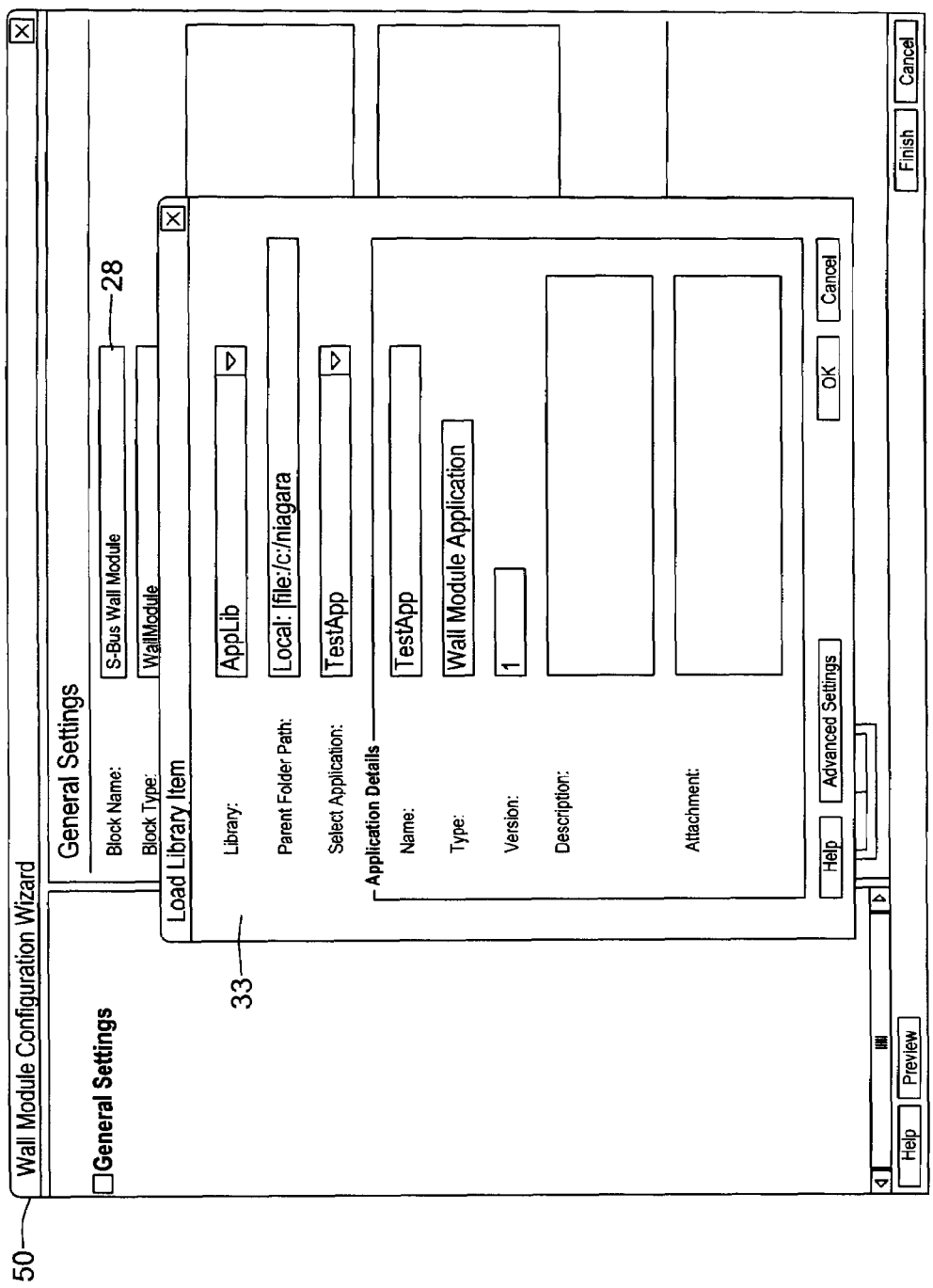

In FIG. 8, component 33 is a clickable directory chooser. The load library item pop up may be triggered when a user clicks or presses the browse button. The user may choose a default custom library location. The existing load library item pop up may be used when the user browses to a different file location. Selecting an application may automatically populate the select application list in the wall module configuration wizard.

Figure 9:
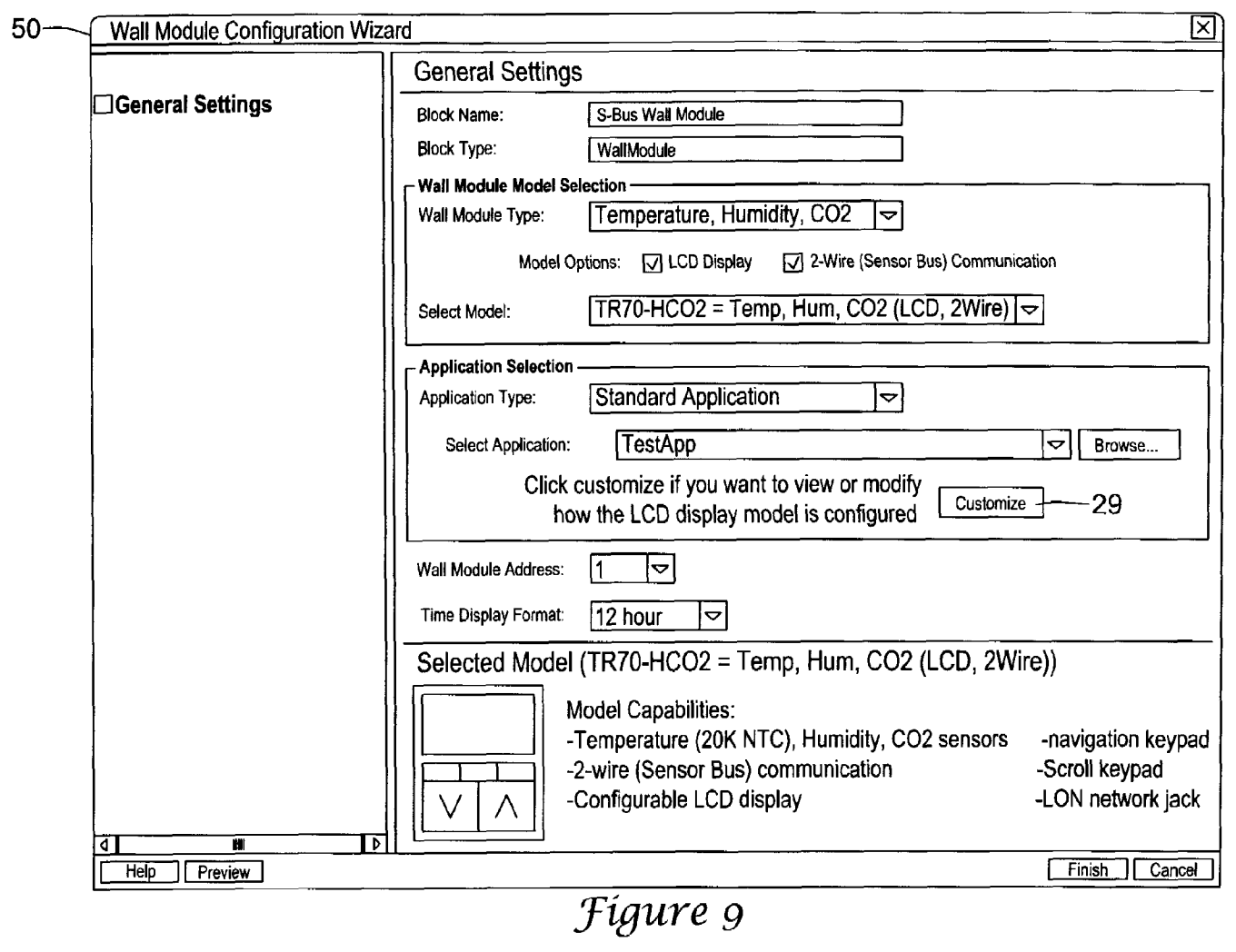

Component 29 of FIG. 9 is a customize button one may click to view or modify the LCD display wall module configuration.

Figure 10:
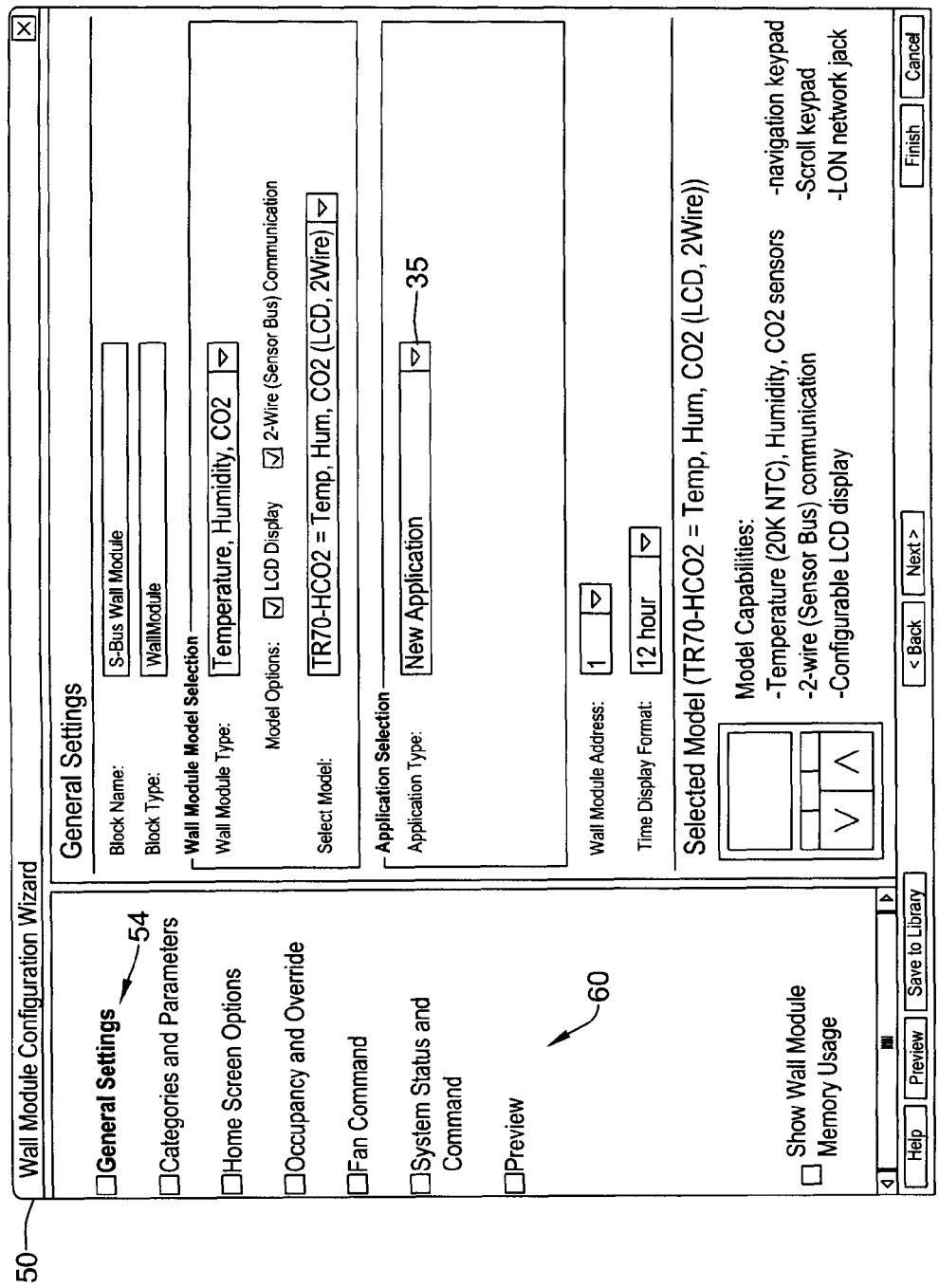

Component 35 as shown in FIG. 10 shows a selection of a new application type. If the user selects the new application type, the select application, customize, browse buttons are not shown and the user is immediately shown all the wizard steps. If the user selects the new application type when the user has already selected either a custom or standard application from the library, then the user may be given a warning indicating that you want to create a new custom application. All changes you made to the configuration and any connections in the control program will be lost.

Figure 11:
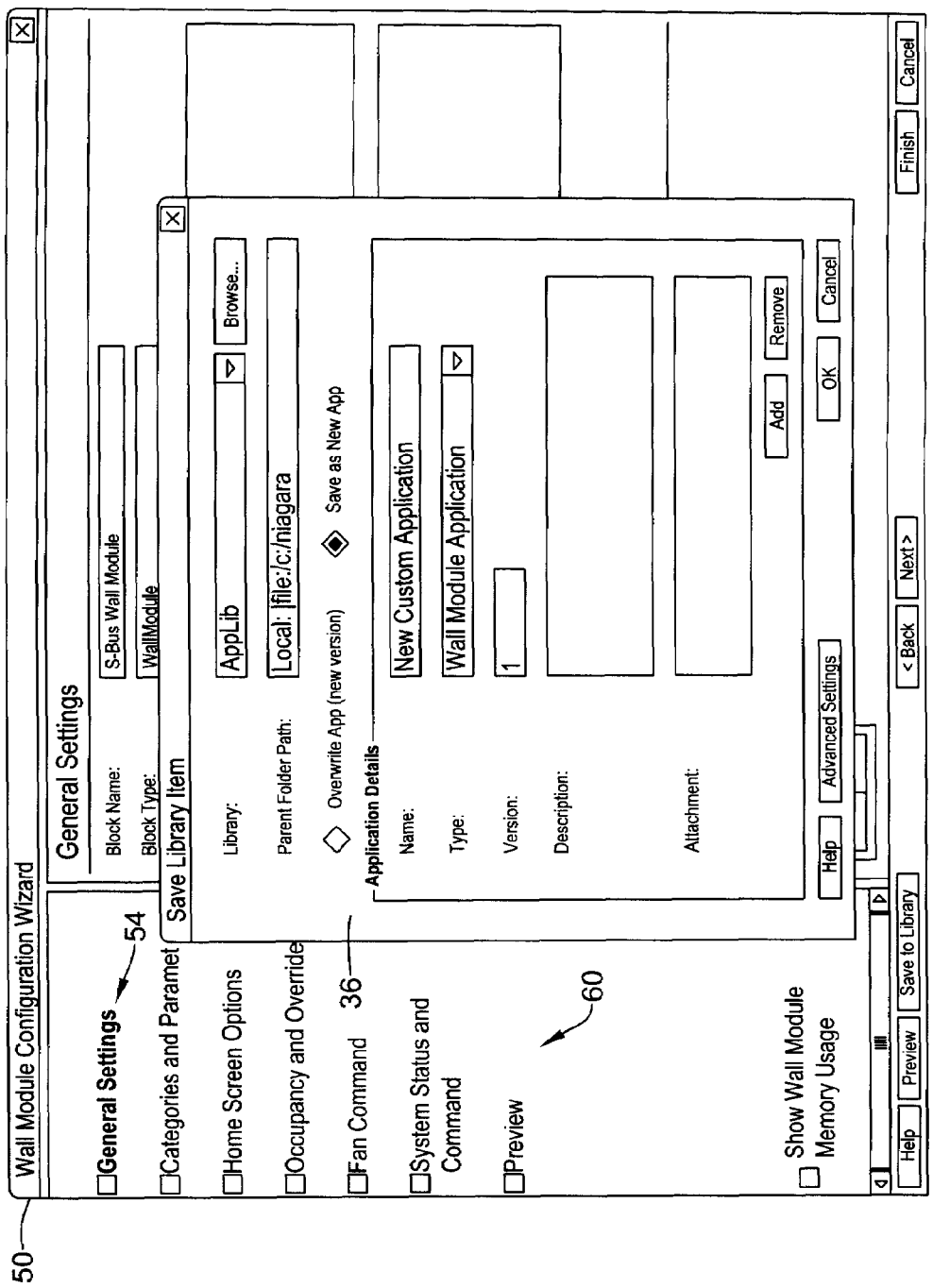

Component 36 in FIG. 11 may be a save to the library pop up. Here, the user can save the current wall module application configuration.

Figure 12:
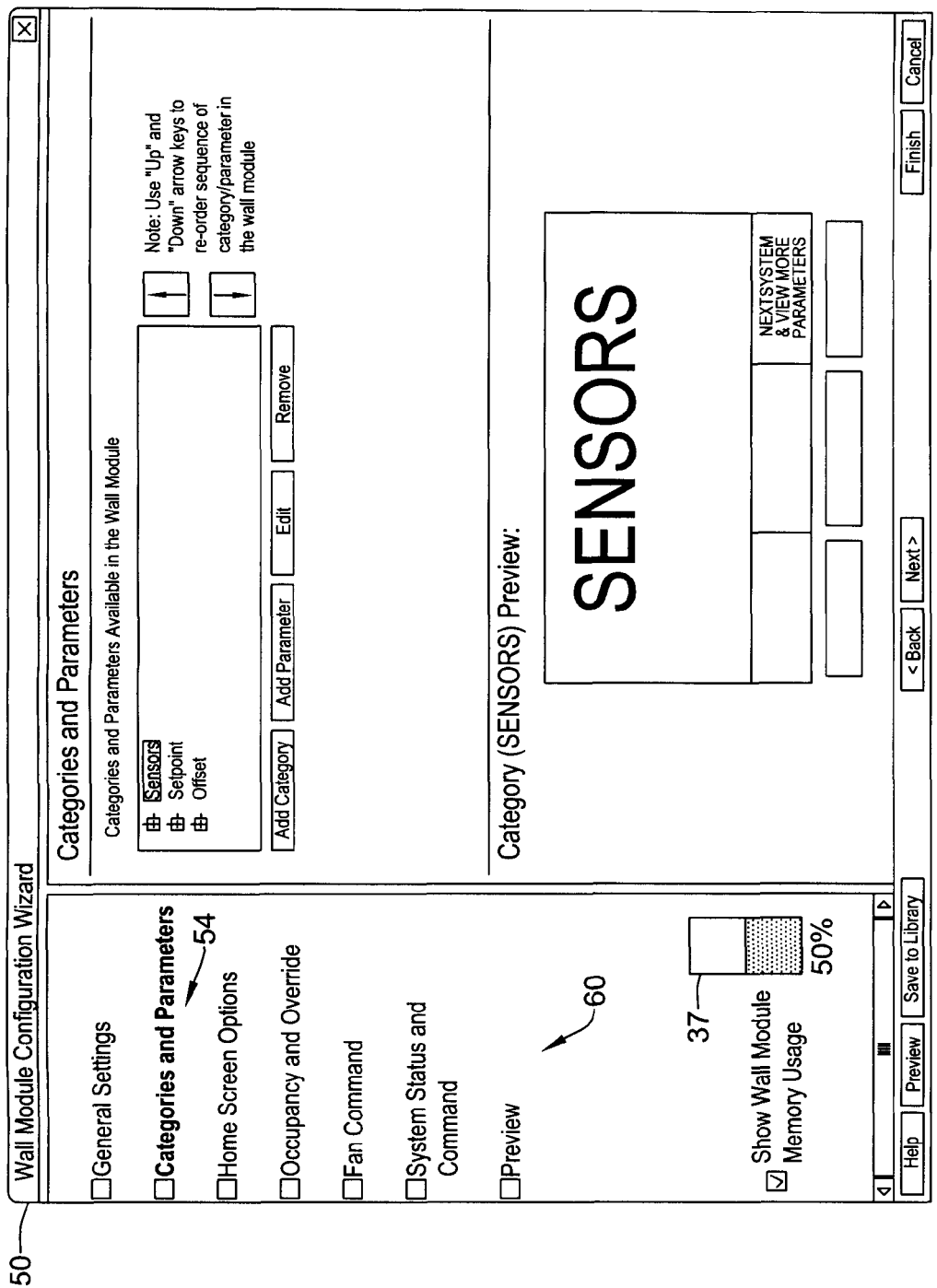

In FIG. 12, component 37 is a memory meter which may show current memory usage for the wall module. The meter 37 may be shown or hidden with a check box near it. The memory meter shows current memory usage in one percent increments. Memory updates are made any time a change is made to the configuration (i.e., adding/removing screens, turning on/off features, pressing Save, Remove, Next, Back, Finish buttons). If the user exceeds the memory available at any time, a warning message may be displayed indicating the current wall module configuration exceeds the available memory, and before you download, you will need to modify the configuration to reduce the memory requirements. Pressing a help button from the warning message may launch a pop-up and show the help specific to memory management.

Figure 13:
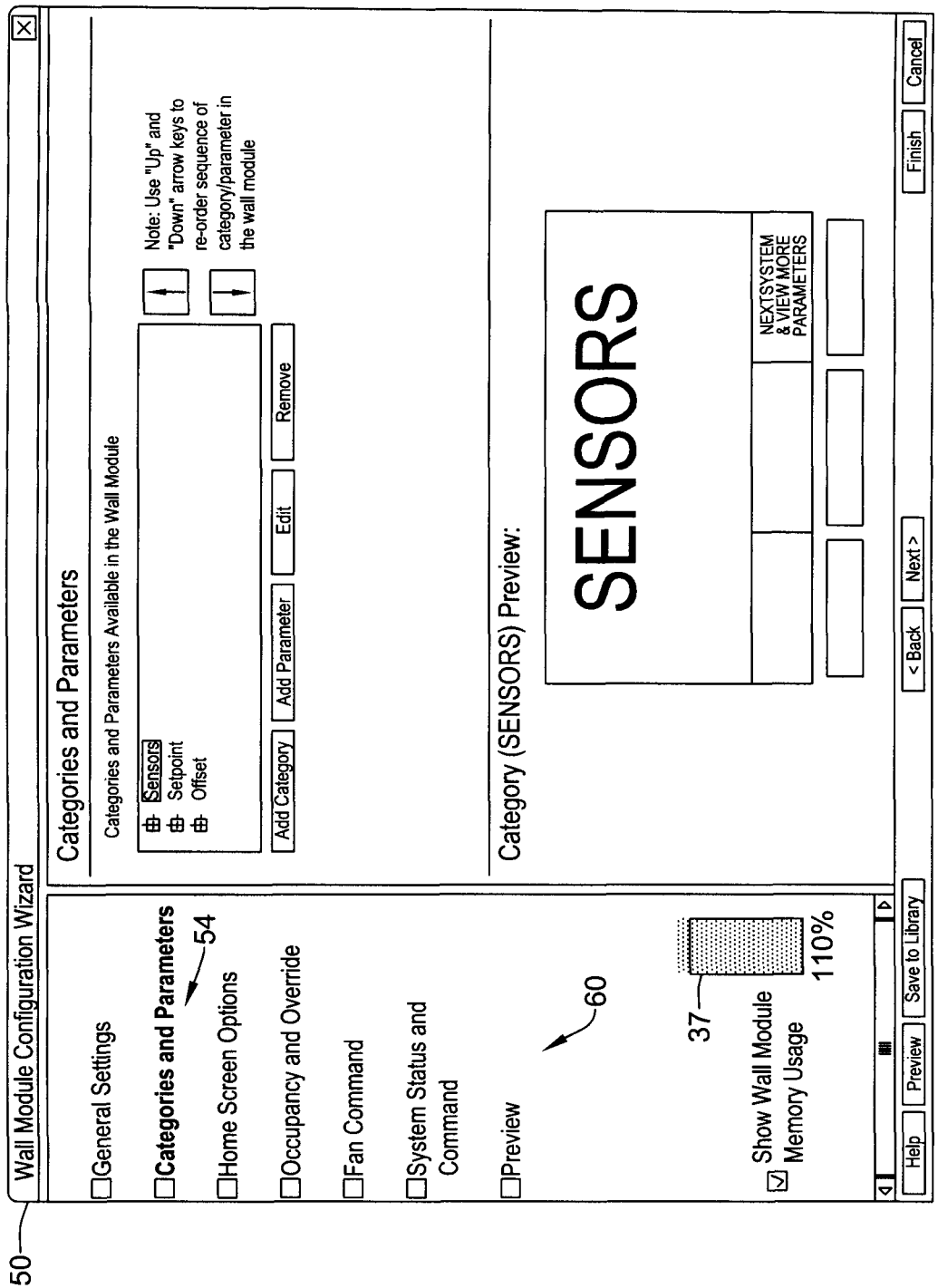

In FIG. 13, component 37 shows an over flow memory meter. The memory meter can show values greater than 100 percent. The fill color for the meter may be set to about 50 percent transparency so that the meter outline is visible through the fill. The color of the fill changes according to the following memory levels. Less than 90 percent it is blue. Greater than 90 percent and less than 100 percent, it is orange. Greater than 100 percent, it is red. Other colors may also be used. The following warning may be provided to the user when the memory usage is greater than 100 percent, indicating the current wall module configuration requires more memory than the model can support. You will need to change the configuration so that the memory usage is 100% or less before pressing the FINISH button. Clicking anywhere on the memory meter may open a pop up and show the help specific to memory management.

Component 38 in FIG. 14 is a memory usage help message. It may show distribution of memory usage for a wall module. It may be closed via the close button. The distribution of memory for each configured component is shown both graphically and via table. Tips to optimize memory usage are shown below the table.

Figure 15:
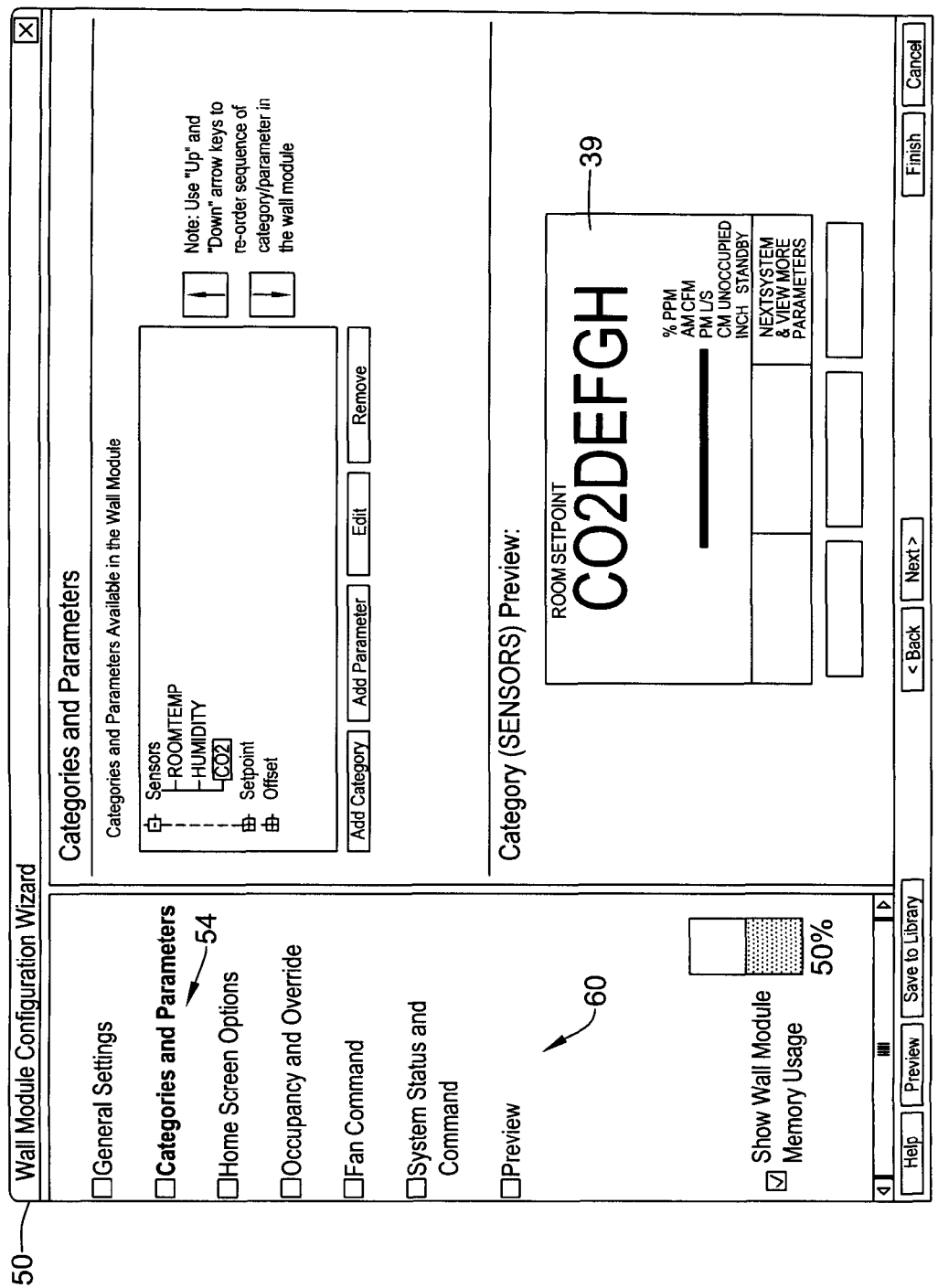
FIG. 15 shows a preview screen for a selected parameter.

In FIG. 15, component 39 provides an example parameter preview screen. It may include the parameter name, segments selected and the number of decimals. It may or may not have a read-only state. The example preview screen for a selected parameter may show the parameter name (CO2), segments selected (ROOM, PPM) and the # decimal places. Dashes (----) may be used to show where values would appear, or actual numbers may be shown where the user wants to change the configuration setting.

Figure 16:
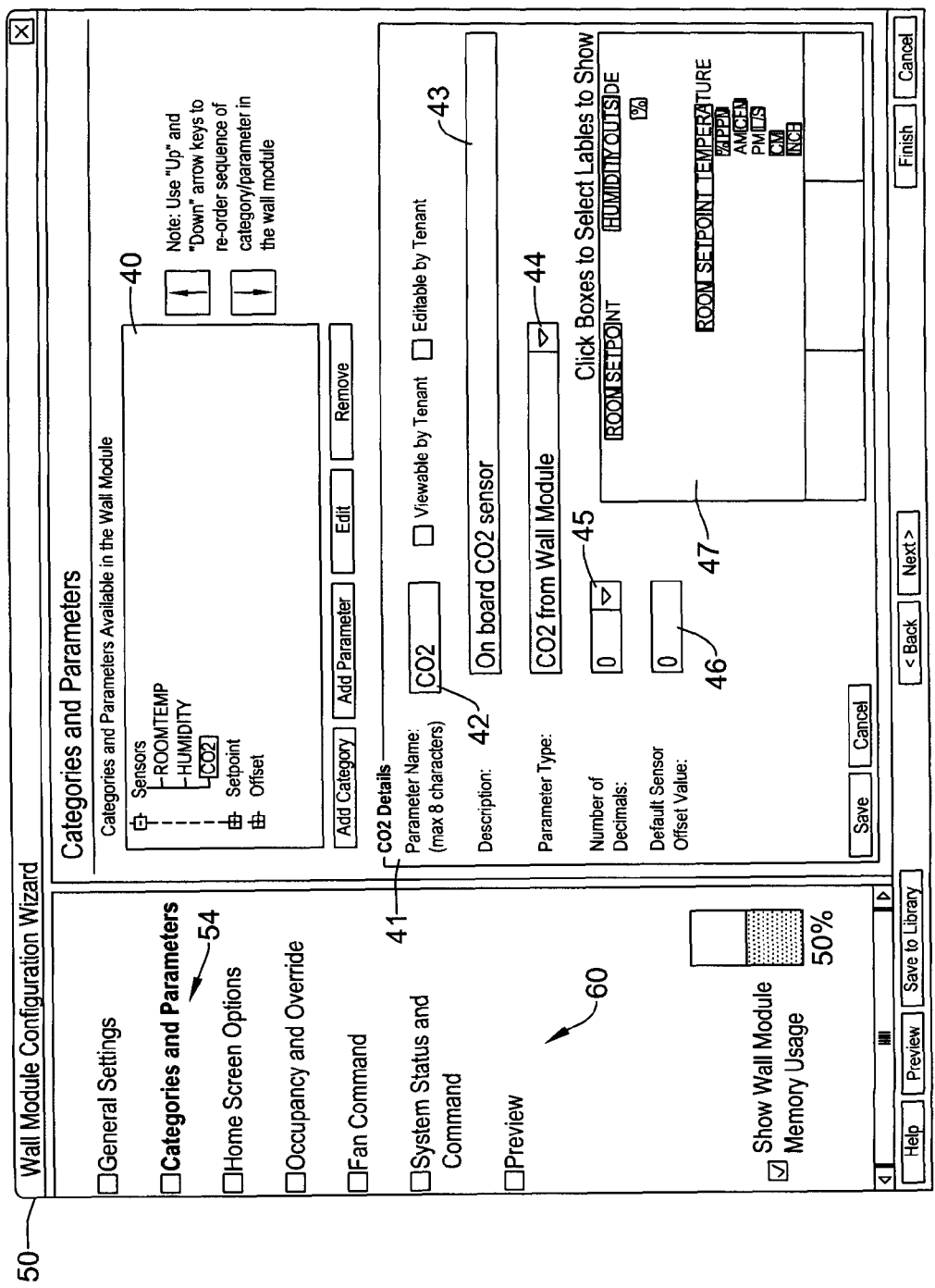

FIG. 16 shows a parameter layout for the wall module. Component 41 is an area bounded by a box that details the parameters. The name of the selected parameter (including newly created ones) may be shown as part of the bounding box followed by the word "Details". Component 42 may show the parameter name which may be editable. The name of either newly created parameter (PARAM1) or selected parameters (CO2) is shown here by default. The user can edit the name. This name may be displayed in the tree of area 40, LCD, function block (slot shown as category.parameter) and previews. The maximum number of characters is about eight, but could be otherwise depending on the hardware screen size and segment size. Parameter names should be unique within a category. If the user tries to save a parameter with the same name, the user may be given a warning message indicating there is another parameter in this category with the same name. Parameters in a category should be unique to avoid confusion.

Component 43 is a parameter description which is editable. Here the user may add a description for the parameter. The maximum number of characters is 255, although the maximum number could be greater or less than 255. Parameter descriptions may be shown to the user via a mouse over in a preview screen. The parameter description may also be available with a mouse over a function block slot in wire sheet.

Component 44 may be a parameter type. Sensor parameter types may depend on the model selected. Several parameter types that the user can select may include Value from Controller, Value from Wall Module, Dynamic Value (i.e., it can be changed by either the controller or wall module—the last one wins), Temperature from Wall Module (depends on model), CO2 from Wall Module (depends on model), Humidity from Wall Module (depends on model), Sensor Offset Value (Internal), and Time. Each parameter type may be preceded by an icon. The parameter type selection may define the fields to be shown. Defaults for sensors may be as in the following—Sensors (Temp, CO2, Humidity): Viewable=disabled, Editable=disabled (does not apply), Number of decimals=0, Default sensor offset=0. There may be defaults for other types of parameters. Parameter types for each sensor should be filtered based on the model selected. In other words, a user cannot add a CO2 sensor parameter if the wall module model does not support it. Component 45 may show a number of decimals selection which applies to all parameter types except time. Options may be 0, 1 and 2, or other. For adjustable value and dynamic parameter types, the number of decimals may affect increment/decrement options.

Component 46 may indicate a sensor off set value which is editable. Users may enter an offset value for the selected sensor. The sensor offset is added to the raw sensor reading to allow the contractor to tune the wall module to the installed environment. Typically this value is 0.0, but may be any number.

Component 47, i.e., screen area, may show labels which show areas. Label (segment) boxes may be selectable. Users can define the segments (labels) to be shown by selecting the corresponding boxes. Selecting a box may toggle the segment (label) on/off. Selected segments (labels) may be shown in preview and in the LCD of the actual wall module after downloading the configuration from the tool.

Figure 17:
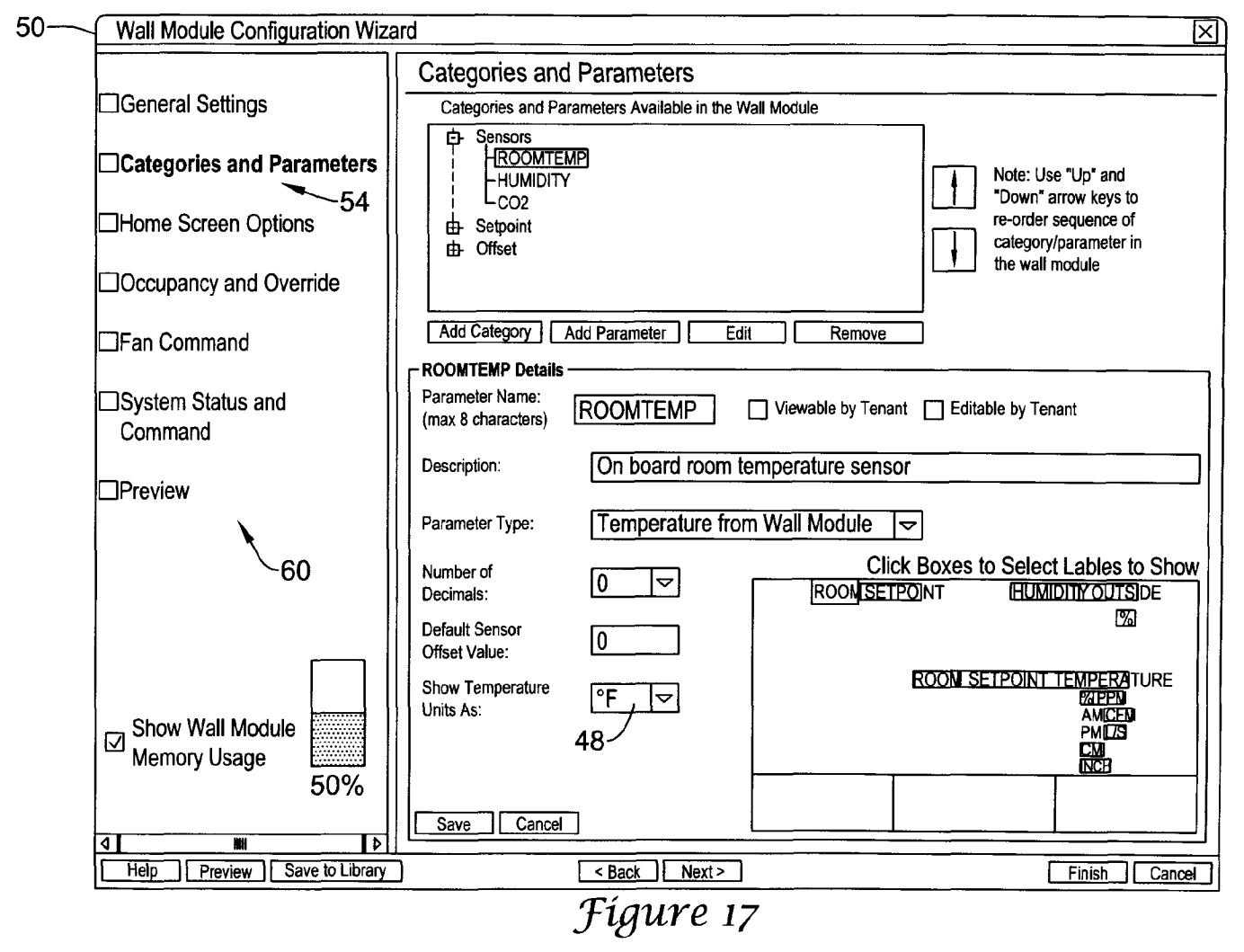

In FIG. 17, component 48 is for selecting units for temperature. For the onboard temperature sensor, the user may have the option of selecting the temperature units for display on the wall module. Options include "° F." (default) and "° C.". This setting only applies to temperature sensor. Other values are independent of units (e.g., a number).

Figure 18:
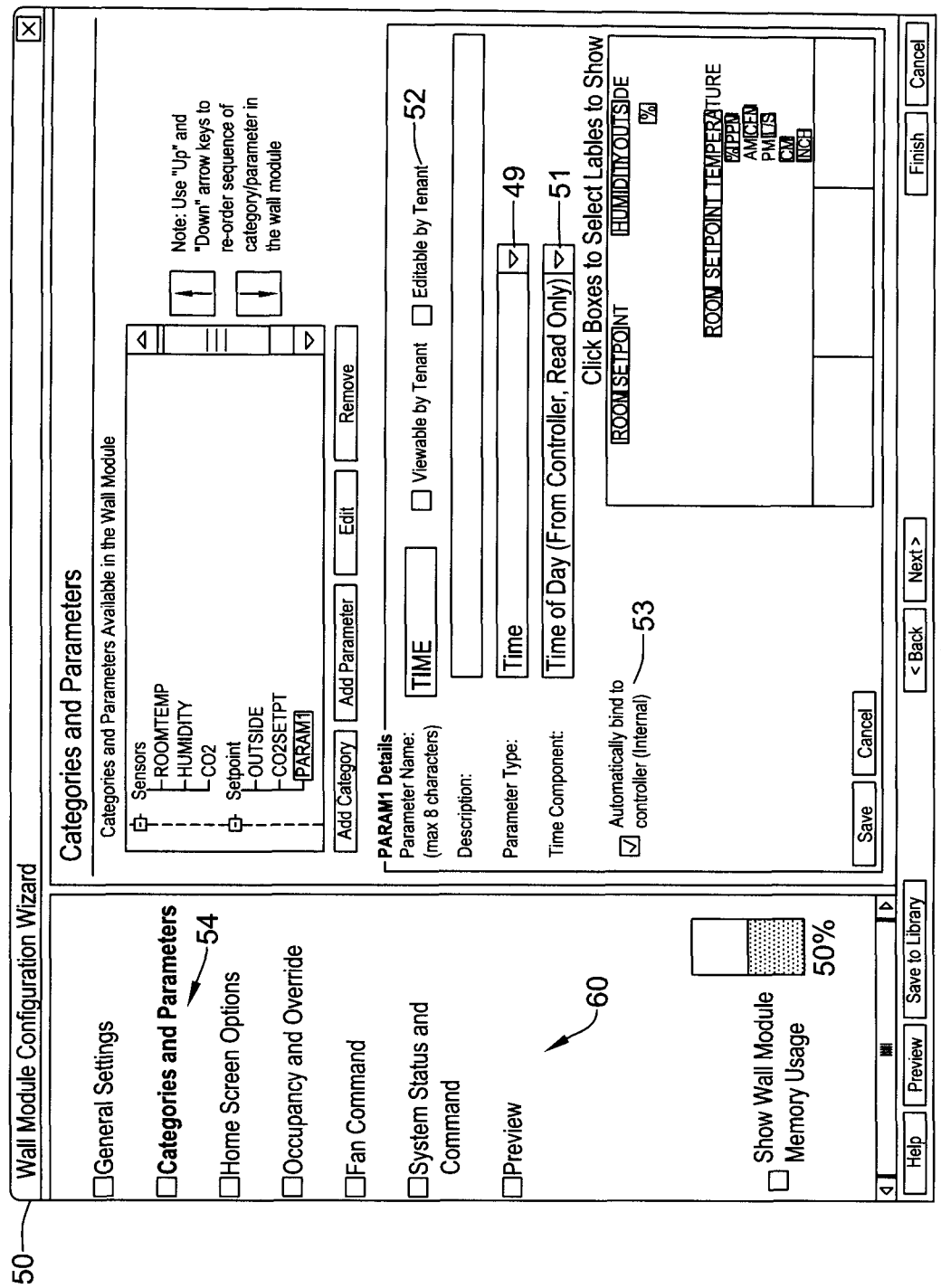

In FIG. 18, component 49 may reveal a parameter type which here is time. Defaults for time may include time to the wall module viewable=not selected and time component=time of day.

Component 51 may be that of time. Here the user can decide what part of time the user wants to configure. The choices may include time of day (from the controller, read only), hours (dynamic value), minutes (dynamic value), day (dynamic value), month (dynamic value) and year (dynamic value).

Component 52 of FIG. 18 may indicate that which is viewable by tenant rules. If "Time of Day" component is selected, editable by tenant may be disabled (because TOD is read only). Editable and viewable may be enabled for other time components.

Component 53 may provide an autobind (e.g., a parameter) to the controller. This may be selected by default. Here, the user may have the choice to bind automatically to the controller. When selected, no slots are shown in the wall module function block and binding is done internally with the controller (like sensor offsets).

Figure 19:
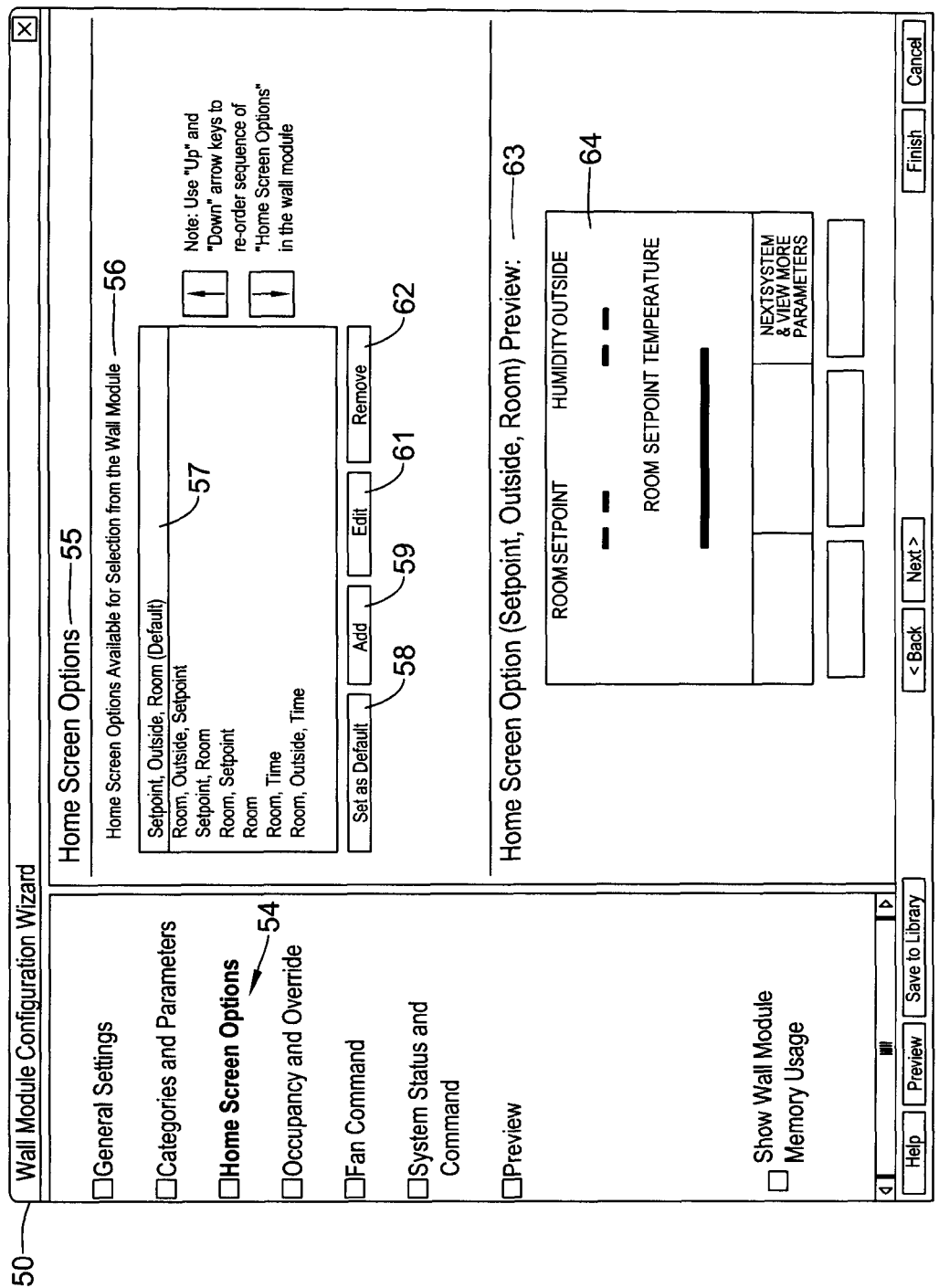

Component 60 as shown in FIG. 19 lists the steps in the configuration wizard. Component 54 is an active step which may be icon clickable and text read. Component 55 may be an active wizard step title. Component 56 may be a label describing a list box with home screen options.

Component 57 may include home screen options having names and being selectable. The home screen is the first screen a user may see when starting to interact with the wall module. Here the user can see the available home screen options that are configured in the wall module. Selected home screen may be shown in the preview area. There may be a default home screen (home screen shown on initial download) which is shown as <HOME SCREEN NAME> (Default). When the user comes to this screen, the default home screen is shown in the top of the list and is automatically selected (preview shown).

Component 58 may be a set as default button which is clickable. Users can change the default home screen by selecting a home screen option from the list and pressing the set as a default button. If the selected home screen is already the default, the button is disabled.

Component 59 may be an add home screen button which is clickable. If the user presses the add button, a new home screen option may be added at the bottom of the tree and the default name will be (New Home ##) where ## is the number of new home screens in the list (starting at 1). Users may automatically be taken to a home screen details screen.

Component 61 may be a clickable edit button. If the user presses the edit button, the user may be taken to the corresponding detail screen for the home screen selected.

Component 62 may be clickable remove button. Pressing this button will remove the selected home screen from the list. The following warning message shown may indicate that you want to remove a home screen option. If you do this the home screen option will not be available in the wall module and you will not be able to undo this change.

Component 63 indicates a home screen option (Name) preview. It is read only. The name of the home screen is shown in parentheses in the preview area. Component 64 is the home screen preview area. There may be a clickable next button. The user can cycle through the previews by pressing the grey button below the next label. The user may be shown the home screen options in a round-robin (open loop) order. The next label does not necessarily show if there is only one home screen option. If so, the button is inactive.

Component 65 of FIG. 20 is a description which is editable. Here the user may add a description for the home screen option. The user cannot type any more upon reaching a set character limit. The limit may be set at a value as appropriate. Home screen option descriptions may be shown to the user via mouse over of a home screen option in the preview area.

Component 66 may be for a clickable and selectable option type. There are two types of home screen options that the user can create. Multiple parameters—the user may select up to three parameters and any labels (segments). Single parameter—the user can select one parameter and provide a unique 8 character label. In both options the user can also select any labels (segments) to show.

Component 67 may be a for label and parameter selection section. The option type selection affects the label and parameter section below. The maximum number of digits for each region is shown as read only text. This may help ensure the user selects the parameters that will "fit" in the region.

Figure 21:
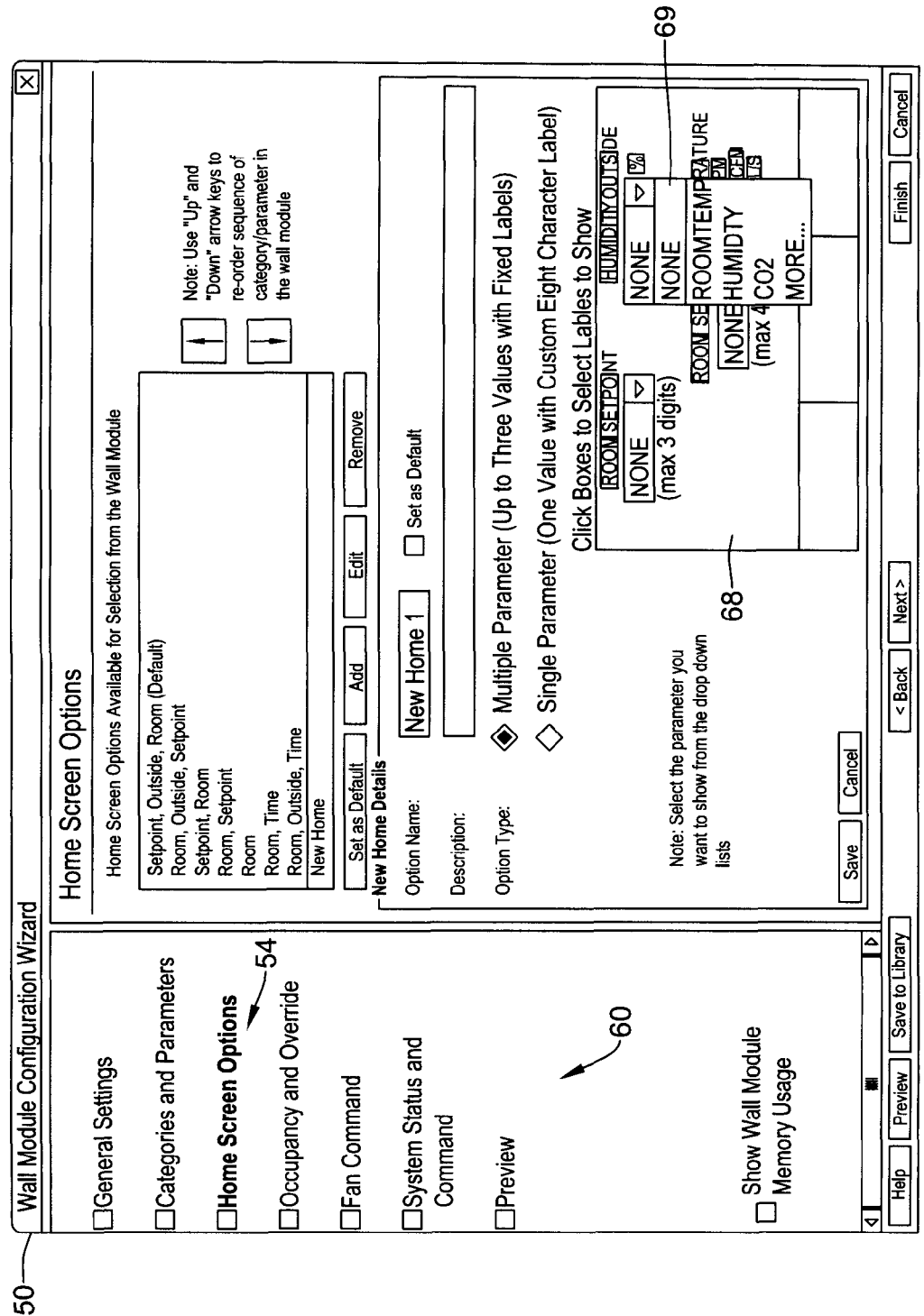

In FIG. 21, component 68 is for selecting labels to show. Users can define the segments (labels) to show by selecting the corresponding boxes. Selecting a box toggles the segment (label) on/off. Selected segments (labels) are shown in preview and in the LCD.

Component 69 is for providing parameter selection drop down lists. There may be three drop down selection boxes for users to select parameters to show (corresponding to three regions in LCD). The number of boxes and parameters may be other than three. Drop down lists show NONE at the top. NONE is the default for new home screens. Drop down lists may be populated with all sensor parameters. Sensors may always be shown in drop down list even if category is removed. If a user selects a parameter with more digits than are available based on position, the available digits should max out in the wall module. For example, if user wanted to show CO2Value (1200) in top left corner, it would max out as 999 on the display (i.e., would show as—in the preview). A warning message may indicate for adjustable value and dynamic parameters selected for the home screen when the low limit or high limit exceeds the number of digits available. This means the parameter value shown in the home screen could be larger than the number of digits. There may be help documentation available that shows the consequences of the above situation.

Figure 22:
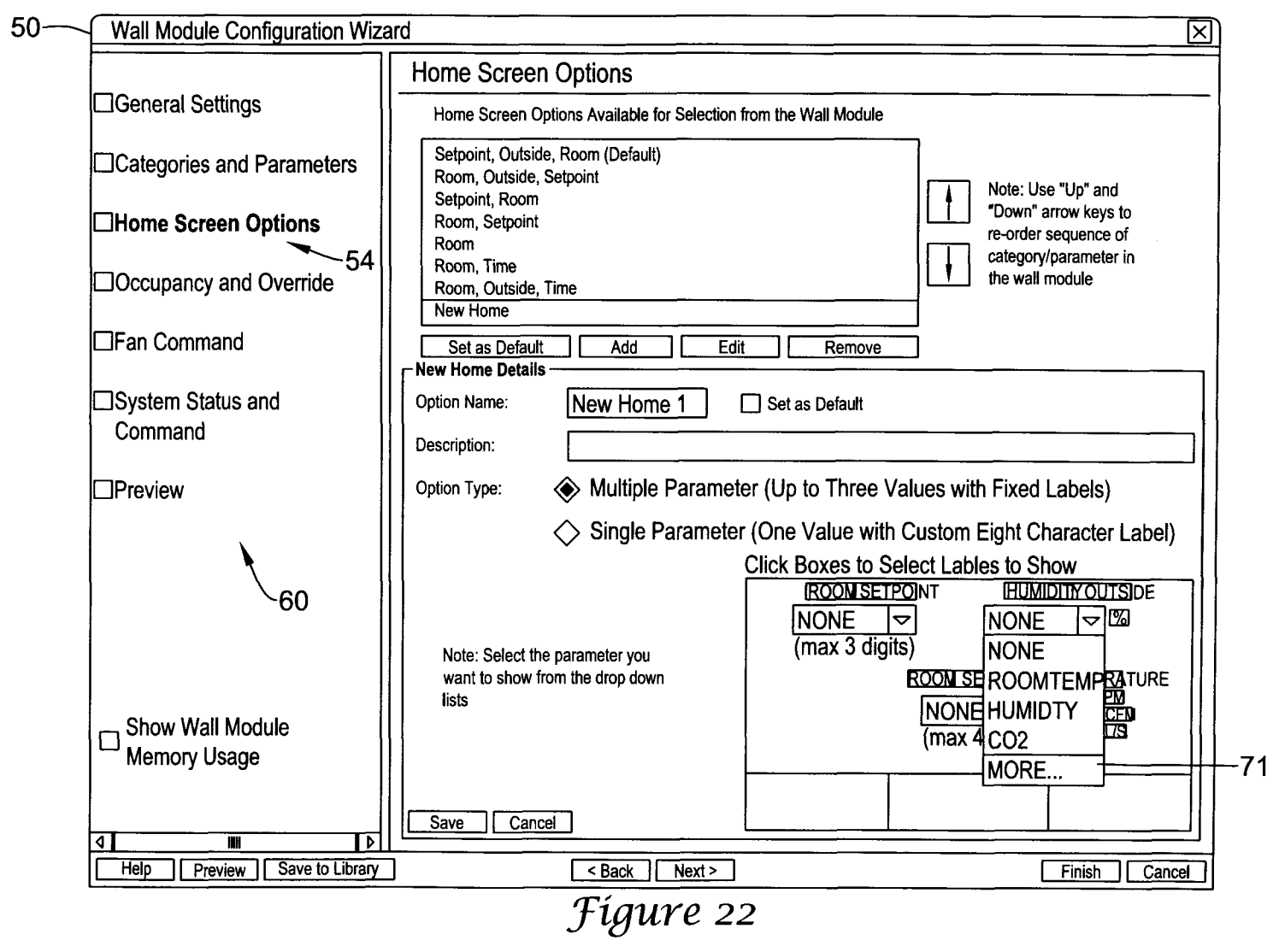

Component 71 of FIG. 22 may reveal more options. Users can choose to see other parameters (those not in a home screen option) by selecting the MORE . . . option. A pop-up screen with all parameters may be shown.

Figure 23:
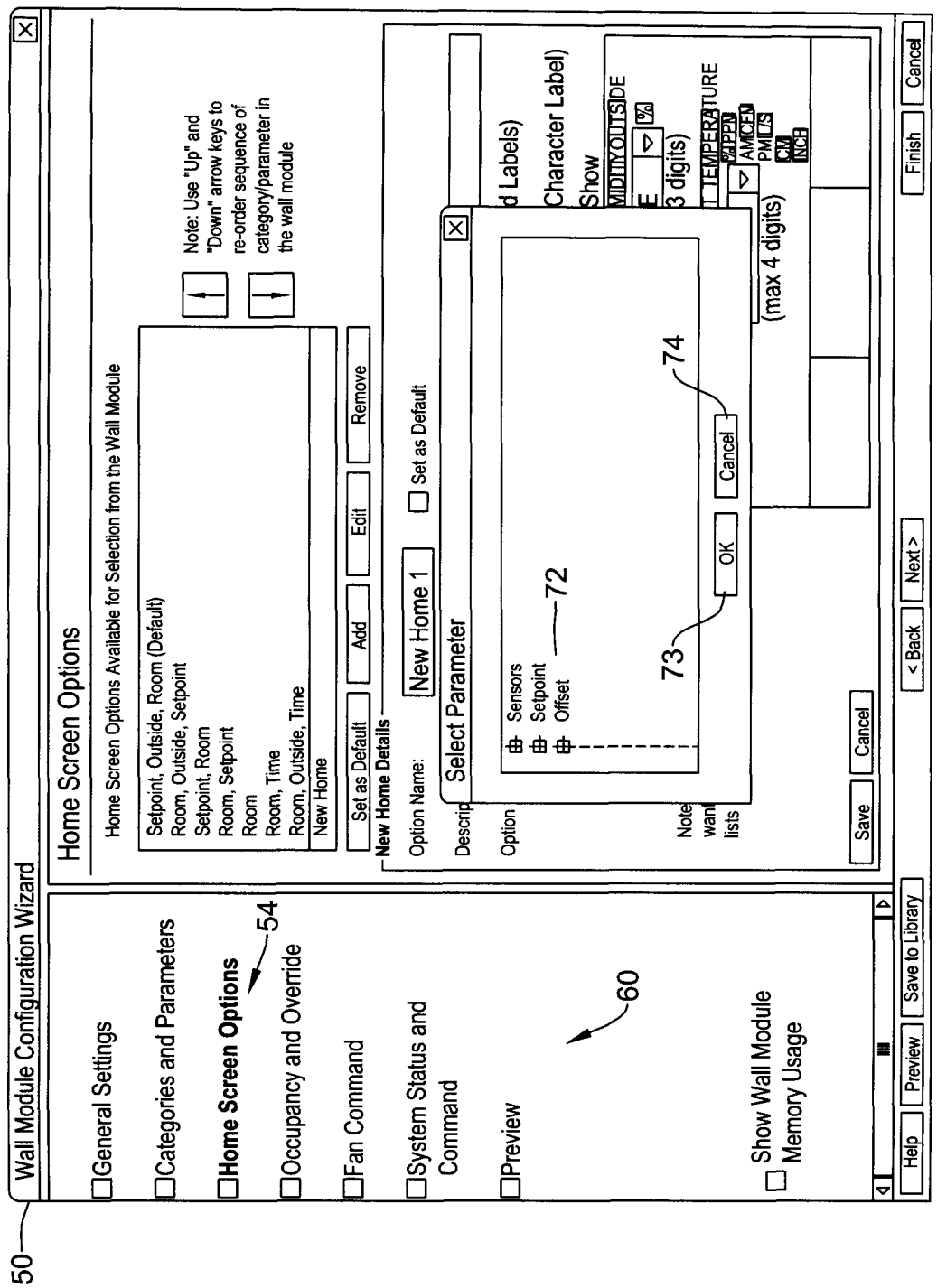
FIGS. 23-24 show a parameter tree and selection of parameters from the tree for home screen use.

In FIG. 23, component 72 may provide a parameters list. Here the user can navigate the list to find the parameter the user wants to show on each home screen region. All of the parameters may be shown in the list (including any already used in home screens).

Component 73 may be an "OK" T button. The OK button may be disabled until the user selects a parameter in the list. Component 74 may be a clickable "Cancel" button. If the user presses the Cancel button any selections made may be ignored and the window is closed (taking the user back to the previous screen with the drop down list still open).

Figure 24:
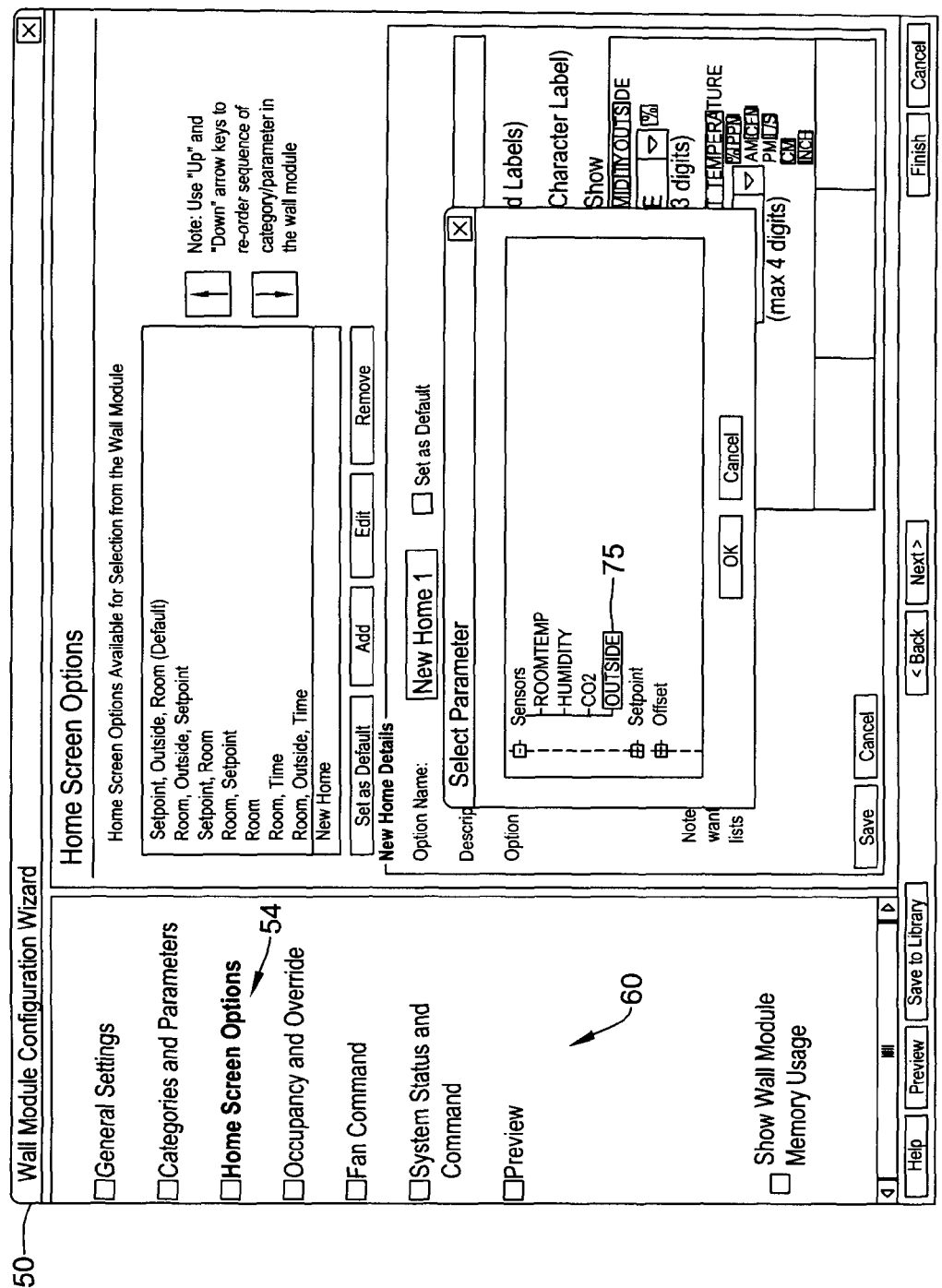

Component 75 may be a selectable parameter as shown in FIG. 24. The selected parameter is highlighted in the tree. The user can press the OK button to accept the selection and close the pop up window. Selecting a parameter for a home screen may create a copy of the parameter for home screen use (referred to as a hidden home screen parameter). This copy may have different segments associated with it but point to the values from the parameter in the parameters section. To keep from having the wall module fill with hidden home screen parameters that may not be used in a home screen, the tool should keep track of the home screens using these hidden parameters.

Figure 25:
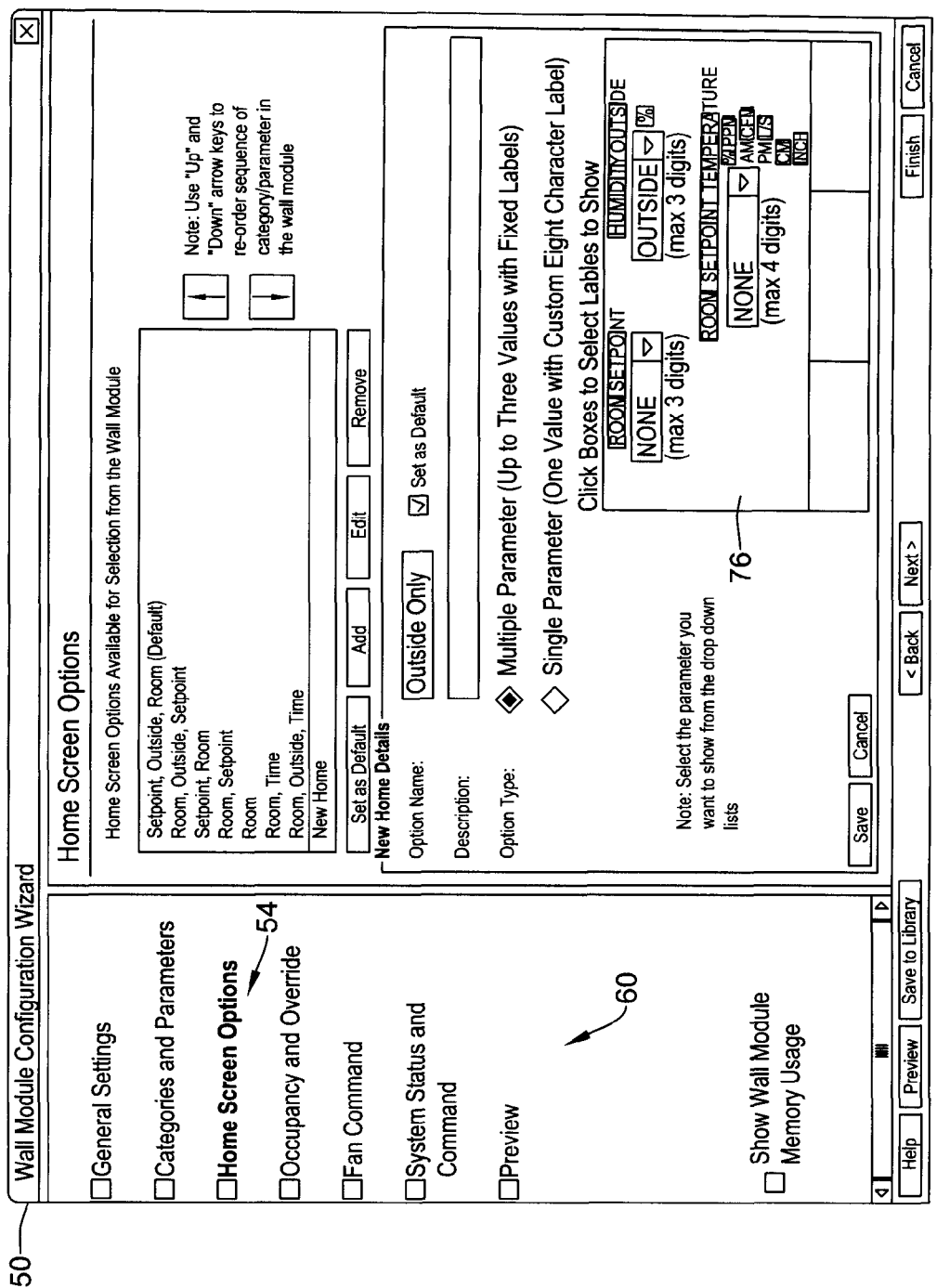
FIG. 25 shows label selection on the basis of segments for selected parameters.

Component 76, as shown in FIG. 25, may be for label (segment) selection behavior. The default labels (segments) may be selected based on the segments defined in the selected parameter configuration. This implies that if three parameters are selected for the home screen, the segments that are selected by default may be a merger of the segments defined as part of the three parameter configurations. The labels may be shown as soon as the parameter is selected from the list (user does not have to press Save). The user may change the segment selections if the user wants.

Figure 26:
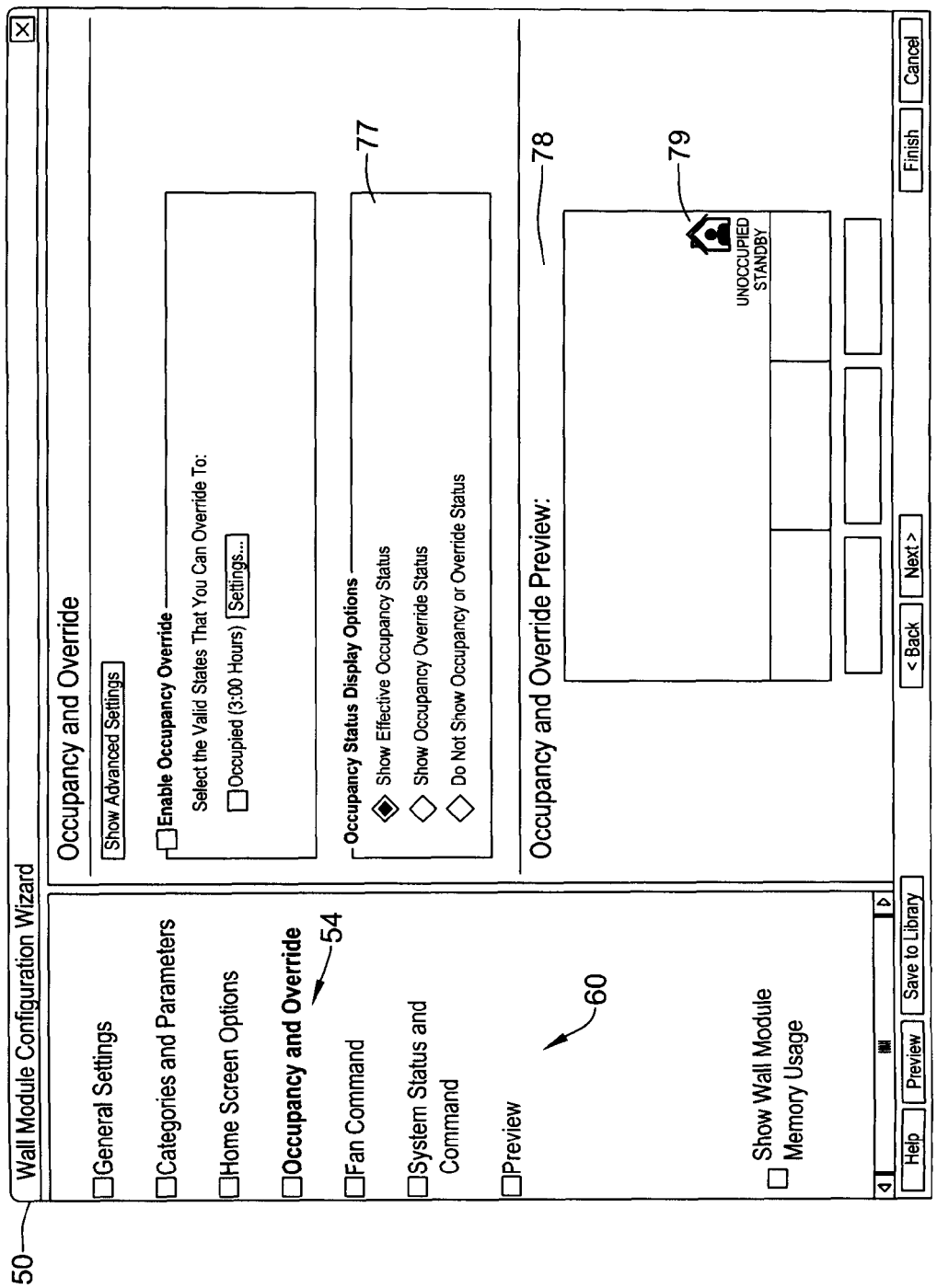
FIG. 26-27 show occupancy status and fan command options and their presence in the preview area.

Component 77 of FIG. 26 may show the display options. Here the user can select how the user wants override status to be displayed in the LCD. The options include, first, show effective occupancy status—LCD shows the actual occupancy status taking into account the application, second, show occupancy override status—LCD shows the occupancy override status initiated from the Wall Module, independent of the application and third, do not show occupancy or override status—LCD does not show occupancy or override, regardless of what the user initiates and the application.

Component 78 may show an occupancy and override preview. This area may show a preview of the LCD override configuration options. Component 79 may show an occupancy status display options preview. Here the user can see the display option that is configured. All valid occupancy states may be shown in the preview with the active one black and other states grayed out.

Figure 27:
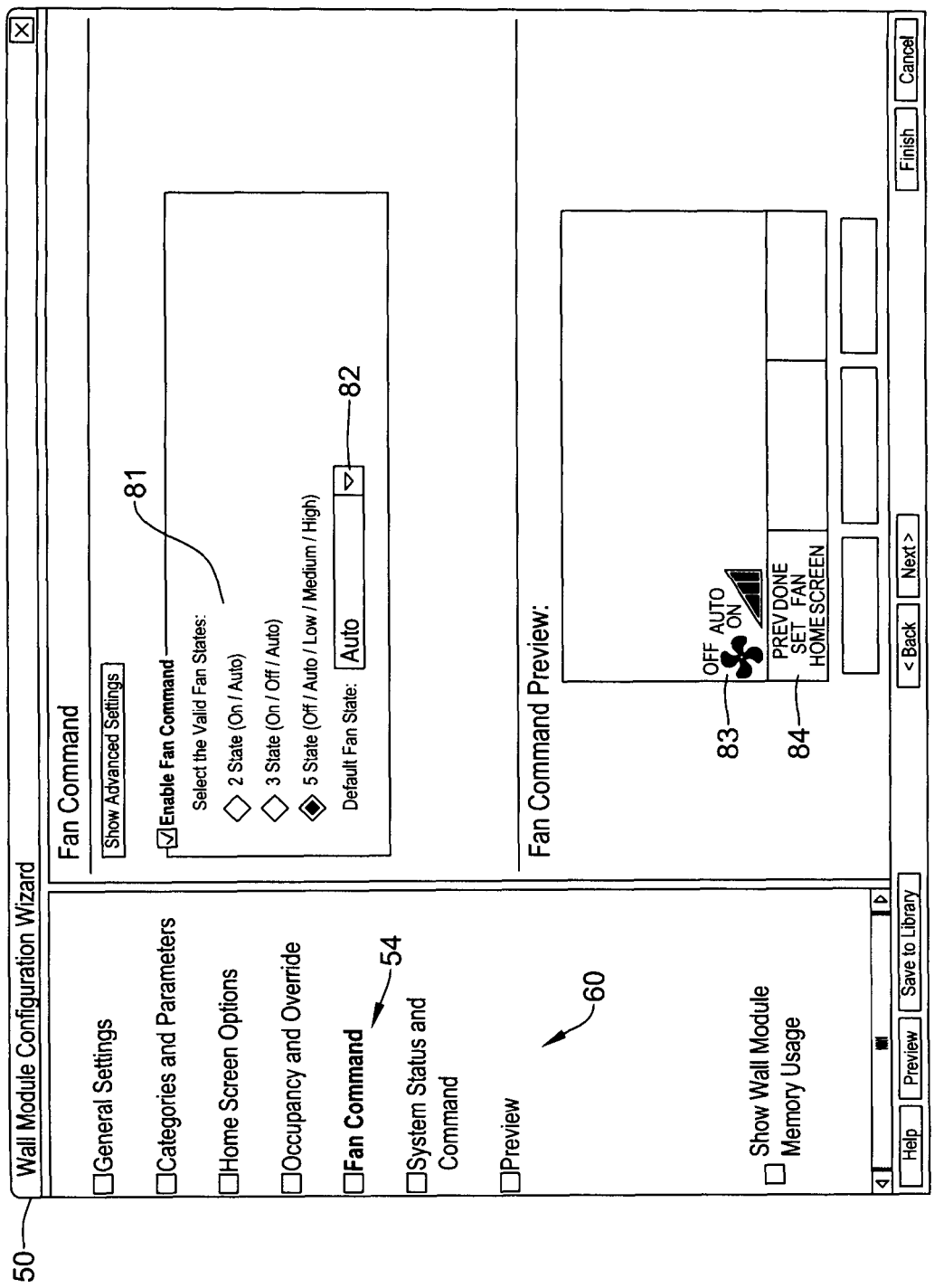

In FIG. 27, component 81 may show fan command options. Here the user may select the fan command option the user wants. The default fan command option may be 2 state (On/Auto). Component 82 may show the default fan state. This field defines the fan state that will be initially downloaded. Defaults for each option may include, 2 state=On, 3 state=On, and 5 state=Auto.

Component 83 may provide a fan command state preview. Here the user can see the fan state that is configured. The default fan state is shown enabled (black). All valid fan states may also be shown as grayed out (varies depending on option).

Component 84 shows the fan soft key label. It is a read only and the button below the label is clickable. If fan command is enabled (via check box above), the FAN soft key label may be shown and the button be activated. Pressing the button may cycle through the available fan command options and the preview area will behave per the LCD.

Figure 28:
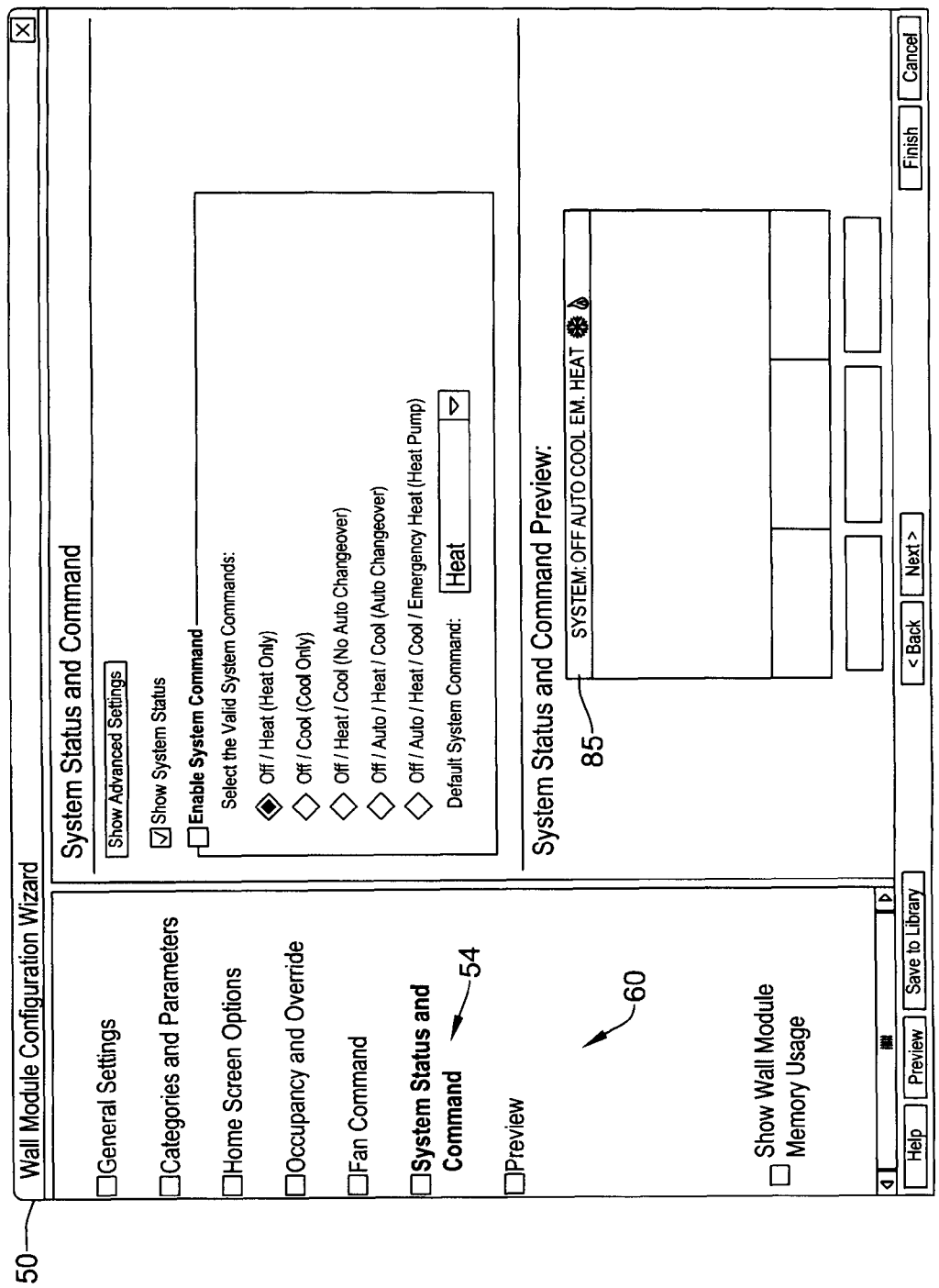
FIGS. 28-29 show a preview of system status and commands based on a configuration option selected.

Component 85 of FIG. 28 may provide a system status preview. When the show system status option is checked, the system status area may show in the preview area, "SYSTEM: snowflake, flame, horizontal line". All system status options are shown as disabled.

Figure 29:
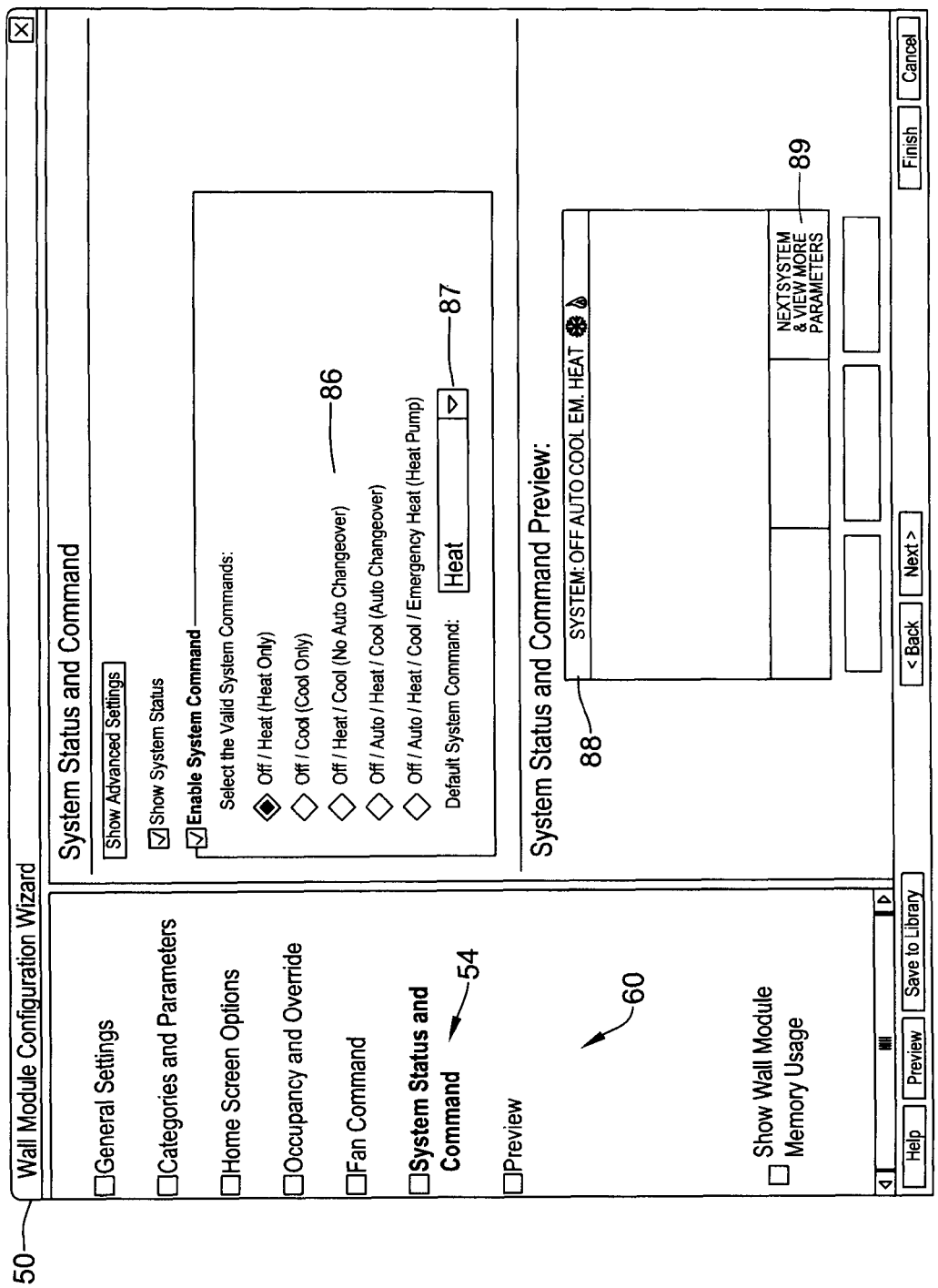

In FIG. 29, component 86 may show system command options. Here the user may select the system command option the user wants. The default system command option is may be "Off/Heat (Heat Only)". Component 87 may show a default system command having a selectable state. This field defines the system command that will be initially downloaded. Defaults for each option may include, Off/Heat=Heat, Off/Cool=Cool, Off/Heat/Cool=Heat, Off/Auto/Heat/Cool=Auto, and Off/Auto/Heat/Cool/Emergency Heat=Auto.

Component 88 may provide a system command review. All valid system commands may be shown based on the configuration option selected. The default system command may be shown enabled (black). Other options may be shown as disabled. If a show system status is not selected, then the enabling system command may also show a horizontal line and SYSTEM label.

Component 89 may be a soft key label. A button below the label is clickable. If system command is enabled (via check box above), the SYSTEM soft key label may be shown and the button be activated. Pressing the button may cycle through the available system command options and the preview area may behave per the LCD.

Figure 30:
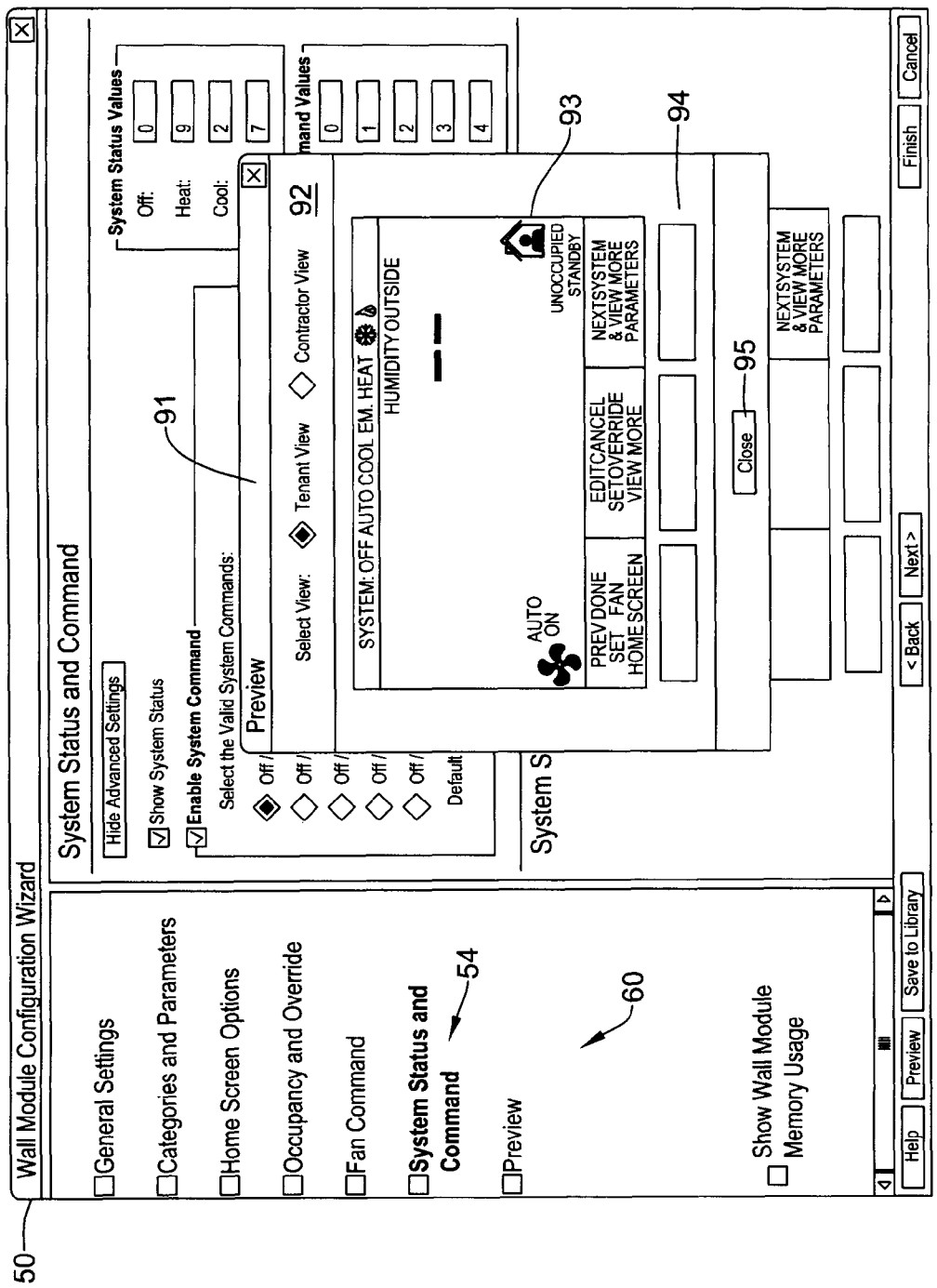
FIG. 30 shows a selection of a preview of wall module settings for a tenant.

Component 91 in FIG. 30 may show a preview pop up. The pop up may be initiated when the Preview button is pressed. If the user presses the preview button, a pop up is shown that allows the user to preview the wall module functionality. The title of dialog is Preview.

Figure 31:
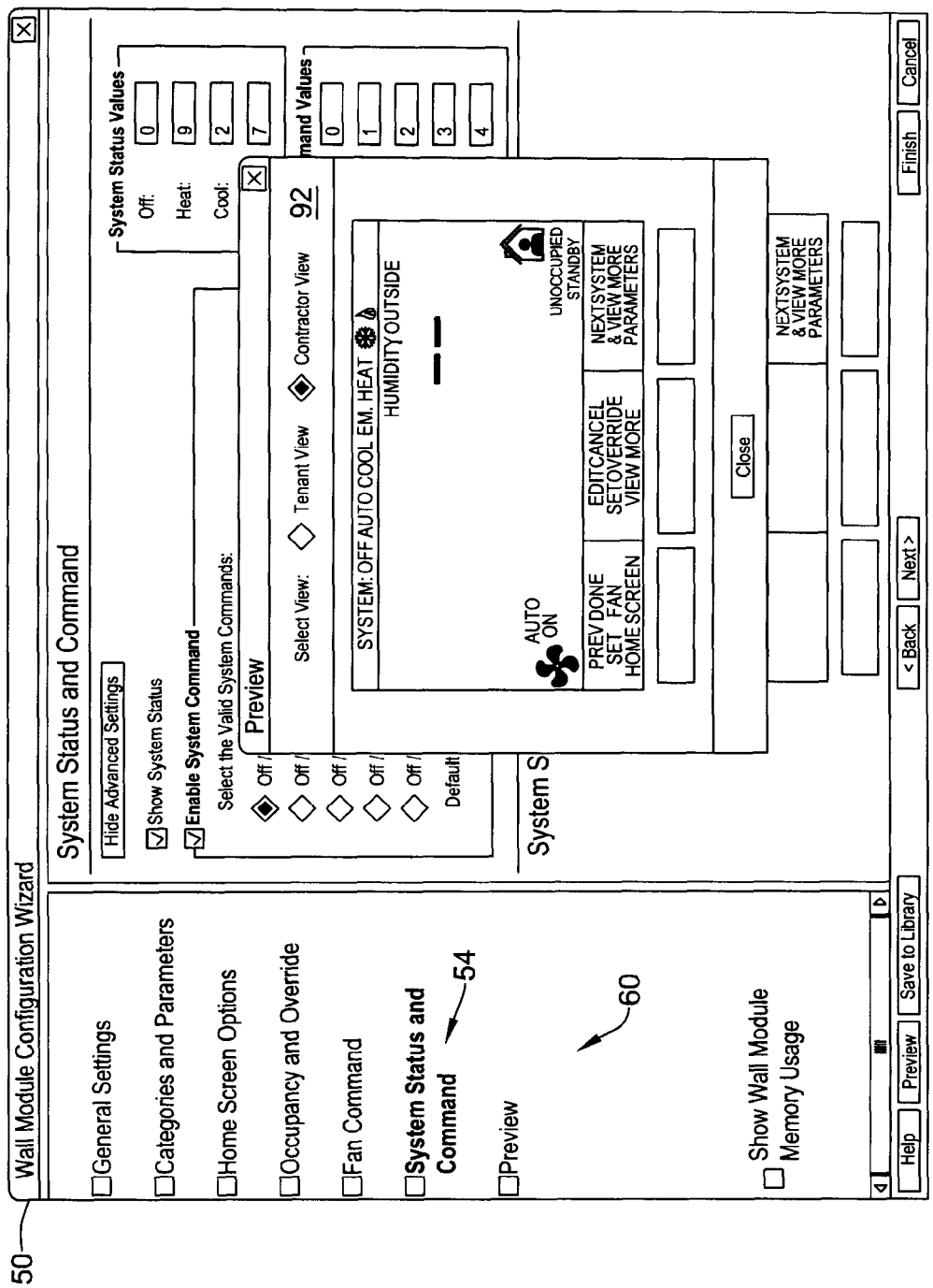
FIG. 31 shows a selection of module settings for a contractor.

Component 92 may provide a review of the options. There may be two preview options. One is the tenant view in FIG. 30 which shows wall module settings for tenant (i.e., someone just walking up to wall module). Another is the contractor view in FIG. 31 which shows wall module settings for contractors (i.e., after they do the secret button press at the wall module). The contractor view allows customization of the tenant view.

Component 93 may provide a preview area. Selecting the views changes the behavior of the wall module below (just like if done at actual wall module). All of the valid settings may be shown based on the configuration at the point the preview button is pressed (including any defaults).

Component 94 may include clickable soft keys. The soft key buttons may function just like the LCD. There are no up/down buttons because none of the settings can be changed. If a soft key segment is not enabled (e.g., FAN) based on the configuration, the soft key button is not necessarily clickable.

Component 95 may be a clickable close button. Since there may be no functional changes associated with this preview, just a close button is provided.

Figure 32:
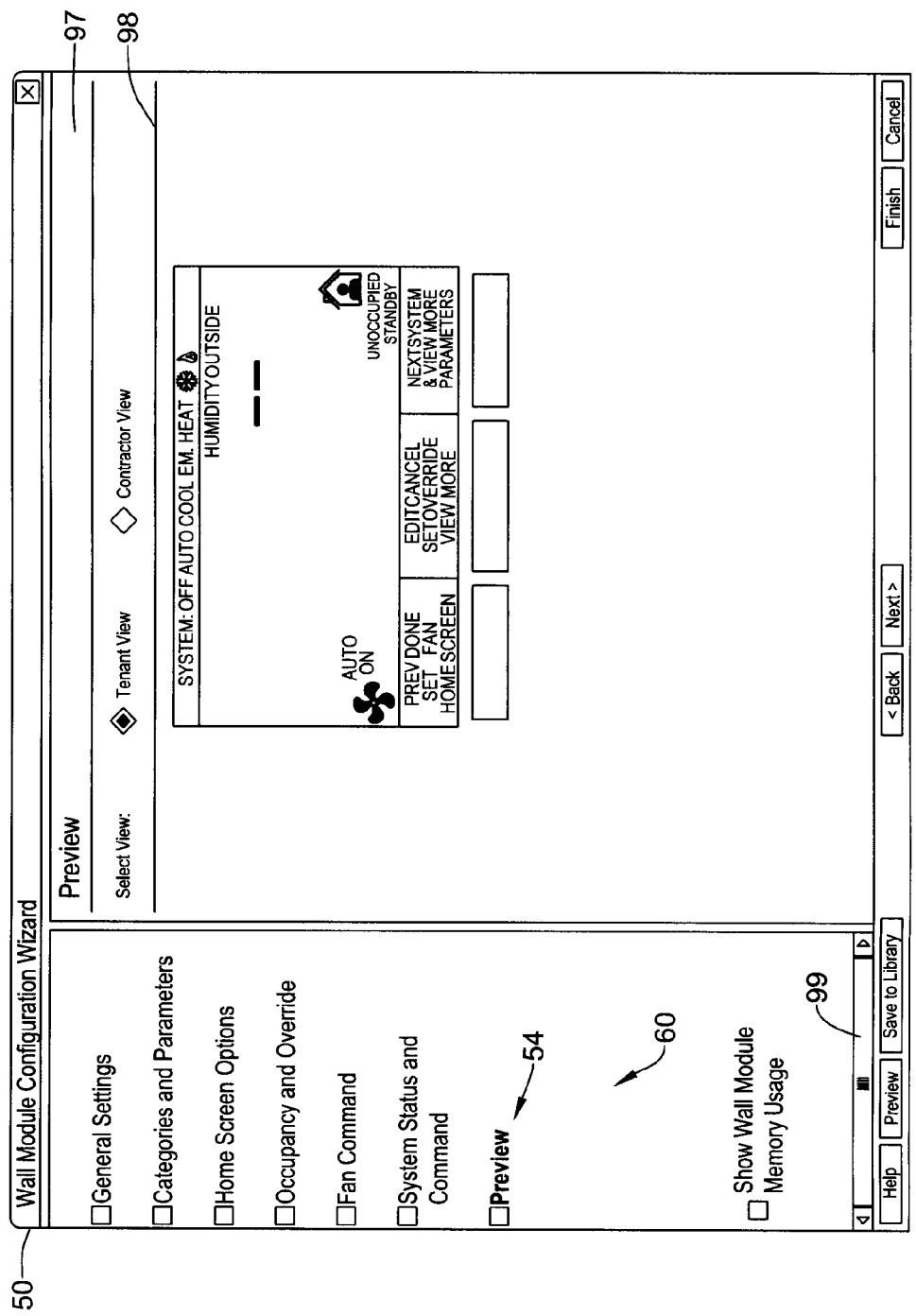
FIG. 32 shows of an active step for obtaining a preview of a screen set-up for a wall module before it is downloaded to the wall module.

Component 54, in FIG. 32 as well as FIG. 19, may provide a step for a preview. It may be icon clickable. Component 97 may be an active step title for preview per a style guide. Component 98 may be a preview area. The behavior of this area may be the same as the preview pop-up dialog. Component 99 may be a preview button. The preview button may be disabled when the user is on the preview step in the wizard.

Figure 33:
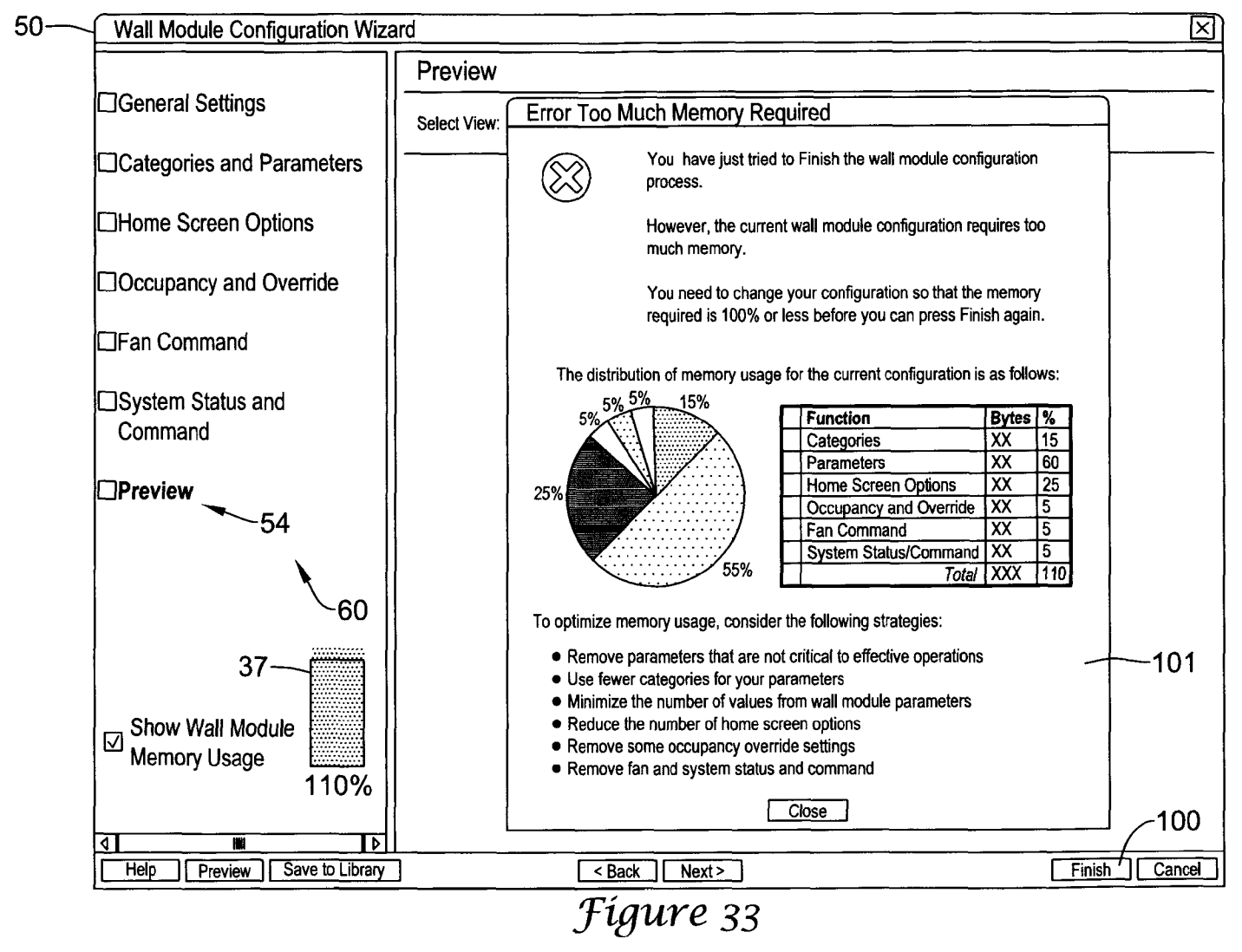

Component 100 may be a clickable finish button in FIG. 33. If the user presses the finish button, a memory usage pop up 101 may appear indicating too much memory required. That memory usage is greater than 100 percent may be shown by memory indicator 37 and the error message in pop up 101.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A wall module configuration system comprising:
a wall module configurator comprising an interface tool for selecting a configuration for a wall module of a building sensing and/or control apparatus, wherein the wall module of the building sensing and/or control apparatus comprises a customizable wall module display;
a graphical user interface associated with the wall module configurator, wherein the graphical user interface is capable of generating and displaying a preview of a simulated screen layout as it would appear on the wall module display if the wall module incorporated the configuration and before a download of the configuration to the wall module;
wherein the wall module references a plurality of parameters;
the wall module configurator is configured to allow a user to select one or more of the plurality of parameters for display on the wall module display, wherein the unselected ones of the plurality of parameters are not displayed on the wall module display;

the wall module configurator is further configured to allow a user to designate a placement location on the wall module display for each of at least one of the selected parameters, resulting in at least one placed parameter; and wherein the resulting preview of the simulated screen layout comprises the select one or more of the plurality of parameters, with each of the at least one placed parameter positioned at the corresponding placement location.

2. The system of claim 1, wherein a user can change the configuration during the preview prior to the download of the configuration to the wall module.

3. The system of claim 2, wherein:

the wall module display comprises screen segments;

the preview of the wall module display is shown with available screen segments;

the screen segments are selectable; and the screen segments which are selected are highlighted in the preview.

4. The system of claim 3, wherein the screen segments in the display of the preview appear as segment boxes which can be selected or deselected to determine if the wall module display should show or hide a screen segment when a parameter is shown on the display.

5. The system of claim 1, further comprising:

a number of default standard application configurations for selection; and wherein:

a selected standard application configuration is customizable; or a new application configuration is constructed.

6. The system of claim 1, further comprising a memory usage indicator for comparing an amount of memory used for the configuration to be downloaded to the wall module, with an amount of memory available in the wall module.

7. The system of claim 1, further comprising an auto-binder for binding time parameters to a controller.

* * * * *